United States Patent
Murakami

(10) Patent No.: US 11,523,031 B2
(45) Date of Patent: Dec. 6, 2022

(54) IMAGE PROCESSING APPARATUS, CONTROL METHOD OF IMAGE PROCESSING APPARATUS, AND STORAGE MEDIUM

(71) Applicant: CANON KABUSHIKI KAISHA, Tokyo (JP)

(72) Inventor: Katsuyuki Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 17/017,421

(22) Filed: Sep. 10, 2020

(65) Prior Publication Data

US 2021/0112180 A1  Apr. 15, 2021

(30) Foreign Application Priority Data

Oct. 11, 2019 (JP) .............................. JP2019-187673
May 20, 2020 (JP) .............................. JP2020-088133

(51) Int. Cl.
  *H04N 1/60* (2006.01)
  *H04N 1/00* (2006.01)
  *H04N 1/12* (2006.01)

(52) U.S. Cl.
  CPC ....... *H04N 1/6033* (2013.01); *H04N 1/00244* (2013.01); *H04N 1/00477* (2013.01); *H04N 1/12* (2013.01)

(58) Field of Classification Search
  CPC ............. H04N 1/6033; H04N 1/00244; H04N 1/00477; H04N 1/12; H04N 1/1204
  USPC ........................................................ 358/1.15
  See application file for complete search history.

(56) References Cited

U.S. PATENT DOCUMENTS

2007/0024657 A1   2/2007  Zhang et al. .................... 347/19
2007/0153340 A1*  7/2007  Itagaki .................. G03G 15/01
                                                       358/518
2018/0268269 A1*  9/2018  Sagimori ............. G06K 15/027

FOREIGN PATENT DOCUMENTS

WO        2005/036869        4/2005

* cited by examiner

*Primary Examiner* — Darryl V Dottin
(74) *Attorney, Agent, or Firm* — Venable LLP

(57) ABSTRACT

An image processing apparatus that performs a color matching process according to a color reproduction characteristic of an objective device, the image processing apparatus including: a printing unit configured to perform printing; a reading unit configured to be capable of reading a first color characteristic chart, which is printed by the objective device, and a second color characteristic chart, which is printed by the printing unit; and a processing unit configured to perform the color matching process, based on first scanned image data, which is obtained by reading the first color characteristic chart by use of the reading unit, and second scanned image data, which is obtained by reading the second color characteristic chart by use of the reading unit.

11 Claims, 28 Drawing Sheets

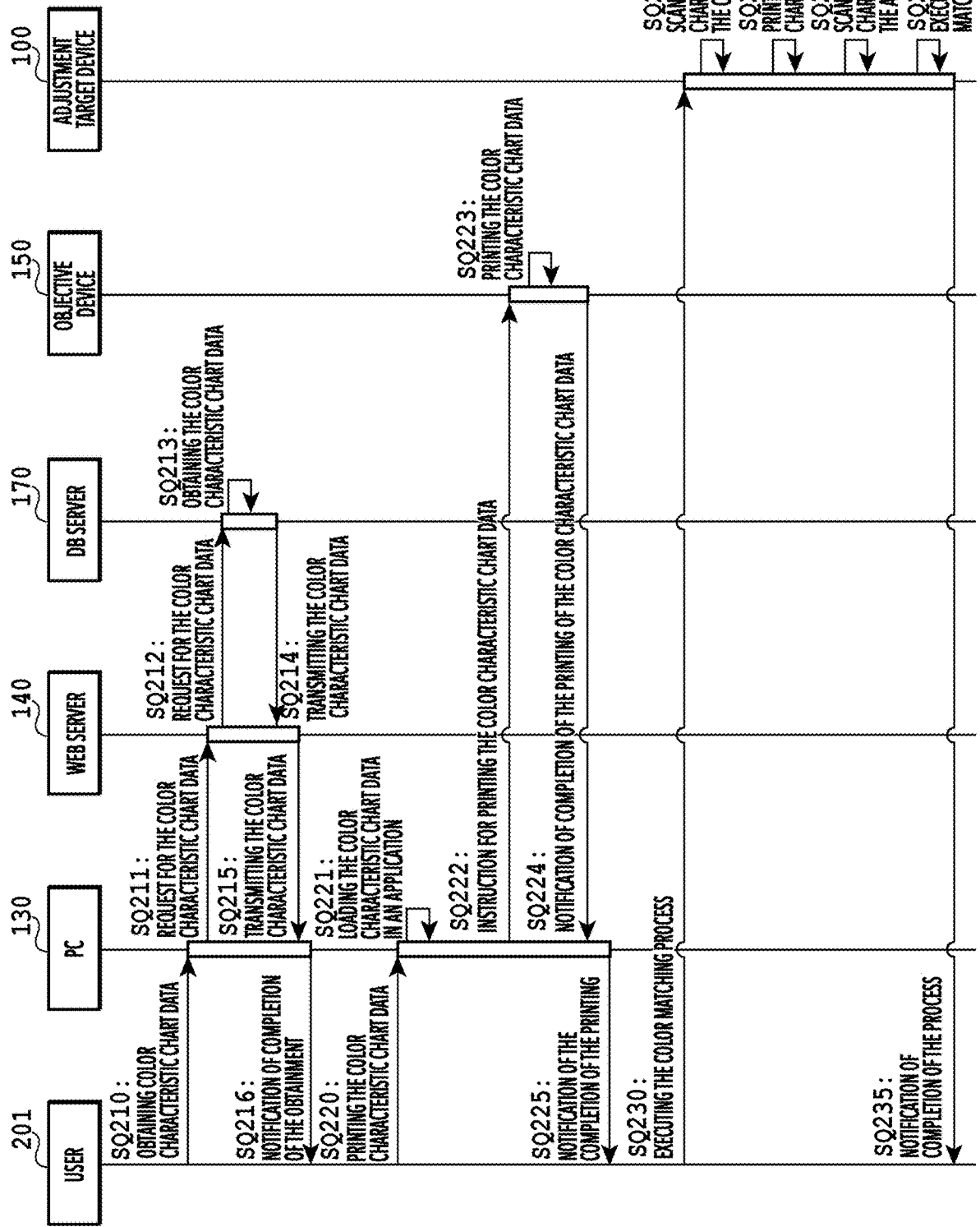

PLEASE SET A COLOR CHARACTERISTIC CHART PRINTED BY THE OBJECTIVE DEVICE ONTO THE FEEDER.

601 OK
602 CANCEL

THE COLOR CHARACTERISTIC CHART OF THE ADJUSTMENT TARGET WILL BE PRINTED.
PLEASE SET A SHEET OF A4 OR A3 IN THE SHEET FEED CASSETTE.

613 SHEET FEED CASSETTE:CASSETTE 1
614 CHANGE SHEET FEED CASSETTE
611 OK
612 CANCEL

PLEASE SET THE COLOR CHARACTERISTIC CHART PRINTED BY THE ADJUSTMENT TARGET DEVICE ONTO THE FEEDER.

621 OK
622 CANCEL

PLEASE ENTER THE NAME TO BE SAVED.

651 COLOR MATCHING PROCESS YYYYMMDD

652 OK
653 CANCEL

| FIG.9A |
| FIG.9B |

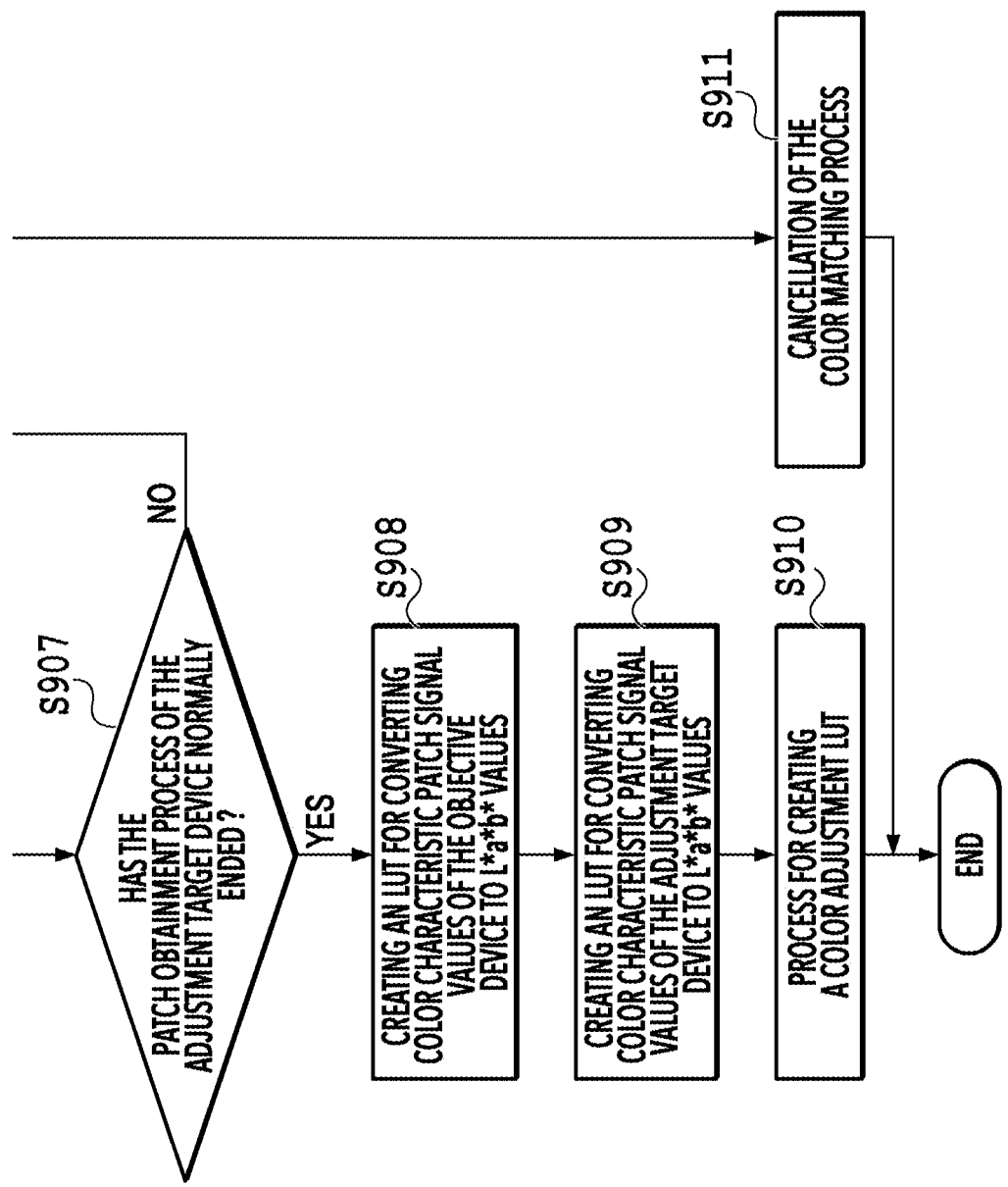

■ LEFT AND RIGHT END COORDINATES (x1 THROUGH x4)
● UPPER AND LOWER END COORDINATES (y1 THROUGH y4)
○ CHART VERTEX COORDINATES (e1 THROUGH e4)

■ EDGE COORDINATES OF A PATCH IN THE x-DIRECTION
● EDGE COORDINATES OF A PATCH IN THE y-DIRECTION

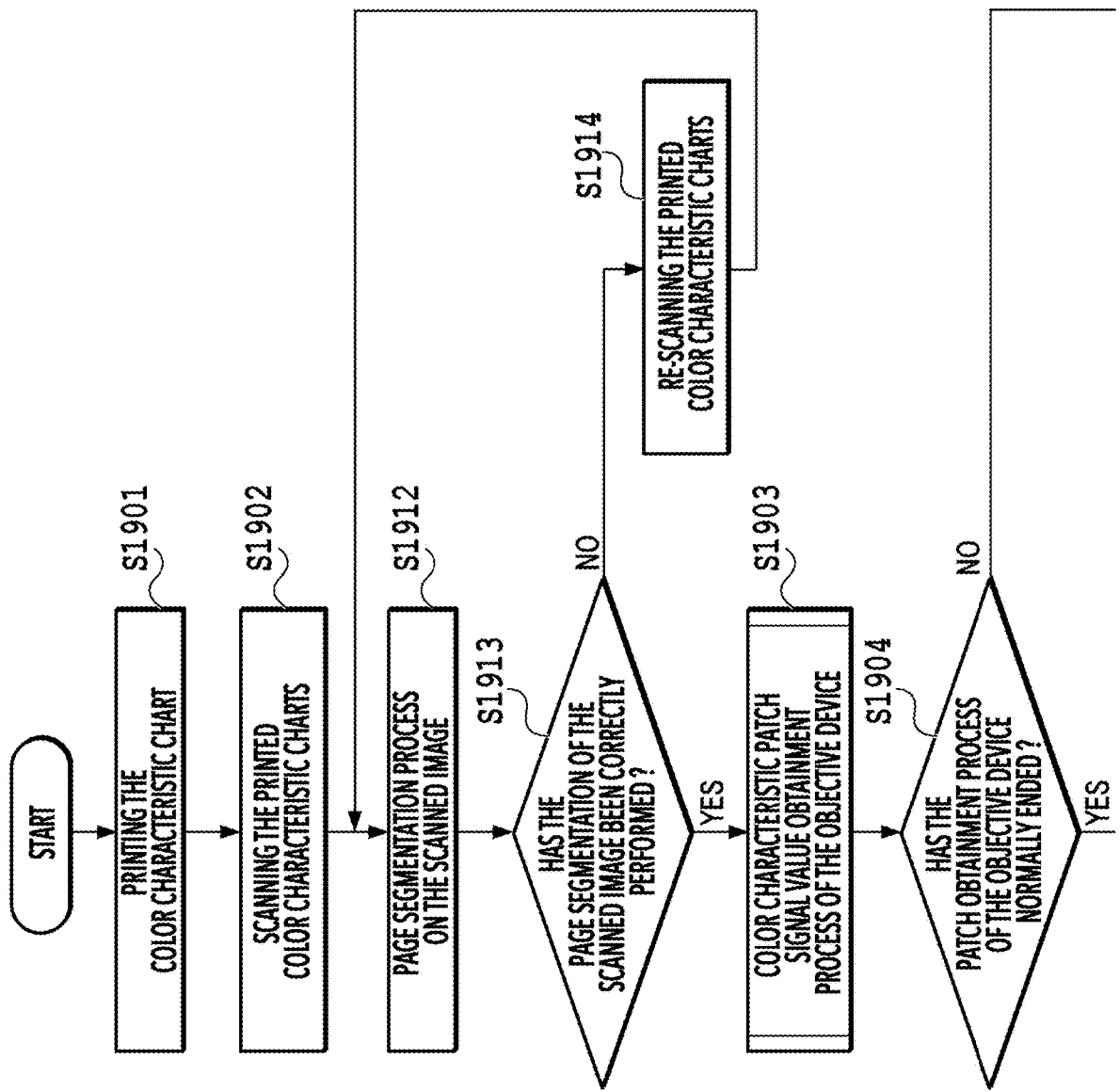

IMAGE PROCESSING APPARATUS, CONTROL METHOD OF IMAGE PROCESSING APPARATUS, AND STORAGE MEDIUM

BACKGROUND OF THE INVENTION

Field of the Invention

The present invention relates to a technology of image processing for matching colors.

Description of the Related Art

There is a technology of matching color reproducibility of a first image processing apparatus (referred to as an adjustment target device) with color reproducibility of a second image processing apparatus (referred to as an objective device) that is different from the first image processing apparatus.

In the color matching process of International Publication No. WO 2005/036869 (hereinafter referred to as Document 1), the objective device prints a color characteristic chart on a special sheet having an opening. On the other hand, the adjustment target device prints a color characteristic chart on a sheet having no openings. Then, by placing the color characteristic chart printed by the objective device on the color characteristic chart printed by the adjustment target device, it is possible to confirm the difference between the color characteristics of the adjustment target device and the objective device for each patch through an opening. Document 1 discloses a technology in which the respective color values of the adjustment target device and the objective device are measured for each patch in the above-described manner, so as to perform a color matching process based on the difference between the measured color values.

For the color matching of Document 1, it is necessary to perform printing by use of a special sheet having an opening. Here, in a case where the characteristic of the paper white of the special sheet is different from the characteristic of the paper white of the sheet being used by the user, there is a possibility that the color printed in a patch is different from the color desired by the user. Therefore, even though the color matching process is performed, the color matching process may not be properly performed, which results in a color characteristic that is not desired by the user.

SUMMARY OF THE INVENTION

An image processing apparatus according to an embodiment of the present invention performs a color matching process according to a color reproduction characteristic of an objective device, the image processing apparatus including: a printing unit configured to perform printing; a reading unit configured to be capable of reading a first color characteristic chart, which is printed by the objective device, and a second color characteristic chart, which is printed by the printing unit; and a processing unit configured to perform the color matching process, based on first scanned image data, which is obtained by reading the first color characteristic chart by use of the reading unit, and second scanned image data, which is obtained by reading the second color characteristic chart by use of the reading unit.

Further features of the present invention will become apparent from the following description of exemplary embodiments with reference to the attached drawings.

BRIEF DESCRIPTION OF THE DRAWINGS

FIG. 1 is a diagram showing the relationship of FIGS. 1A and 1B;

FIG. 2 is a diagram illustrating an overall sequence of a color matching process;

FIGS. 6A through 6D are diagrams illustrating examples of a UI displayed on the adjustment target device;

FIG. 9 is a diagram showing the relationship of FIGS. 9A and 9B;

FIGS. 9A and 9B are totally a flowchart illustrating an example of the color matching process;

FIG. 19 is a diagram showing the relationship of FIGS. 19A and 19B;

FIGS. 19A and 19B are totally a flowchart illustrating the color matching process;

DESCRIPTION OF THE EMBODIMENTS

Figure 1A:
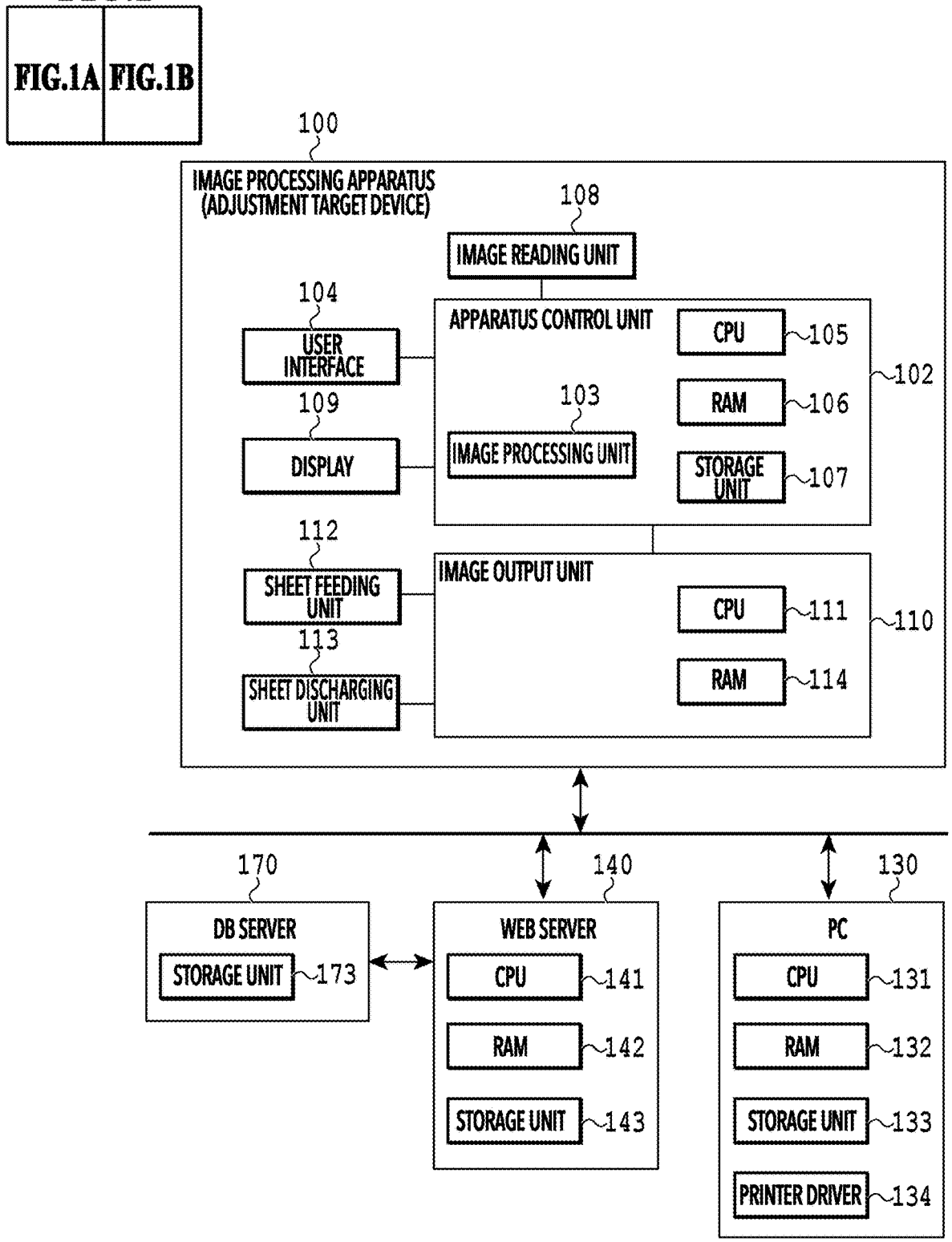
FIGS. 1A and 1B are totally a block diagram illustrating an example of a system configuration.

Hereinafter, modes for carrying out the present invention are explained with reference to the drawings. Note that the components described in the following embodiments are merely examples, and it is not intended that the scope of the present invention is limited to the embodiments.

First Embodiment

In the present embodiment, an explanation is given of the example in which color reproducibility of the first image processing apparatus is matched with color reproducibility of the second image processing apparatus. For example, the process of matching color reproducibility is performed in a case where an image processing apparatus of an old model whose expected lifespan has passed is replaced with a new model or in a case where a new image processing apparatus is additionally purchased due to a change in an office size. In a case of replacement or additional purchase as described above, there is such a user need that the colors of the image processing apparatus before the replacement or the already-owned image processing apparatus is inherited by the new image processing apparatus. That is, the user might demand that the colors reproduced by the first image processing apparatus (also referred to as the adjustment target device), which is new, are identical to the colors reproduced by the second image processing apparatus (also referred to as the objective device), which is replaced.

In order for the adjustment target device to represent the colors that are represented by the objective device as desired by the user, the color reproduction characteristics that are currently represented by the objective device need to be correctly measured. The color reproduction characteristics that are currently represented by the objective device are color characteristics represented in printing by the objective device, which include contents related to colors that are set for printing, such as density adjustment. In the present embodiment, the color reproduction characteristics of the adjustment target device and the color reproduction characteristics of the objective device are measured. Then, a process for creating a Look-Up Table (hereinafter referred to as an LUT), in which an input value that is input to the adjustment target device is converted into an output value to be reproduced by the objective device, is performed. Hereinafter, the process for creating the LUT is referred to as the color matching process. Further, by applying the conversion LUT created by the color matching process to a color management system (hereinafter referred to as the CMS), the adjustment target device is enabled to reproduce the colors of the objective device.

In the present embodiment, the color matching process is realized by use of a scanner mounted on an image processing apparatus. For example, a color characteristic chart is printed by the objective device to confirm the color reproduction characteristics of the objective device. Furthermore, a color characteristic chart is also printed by the adjustment target device. Then, by use of a scanner of the adjustment target device, the respective scanned image data of the printed color characteristic charts are obtained. Thereafter, in the obtained scanned images, processing of detecting an image area having the same color value in a rectangular area, which is referred to as a patch, in order to adjust the color reproduction characteristics, based on the signal values within the areas, is performed. Details are described later.

In addition, for example, in a case where the objective device prints the color characteristic chart in 2-in-1, which corresponds to a change in the page layout, the entire chart is reduced in size to 67% or less. As a result, there is a possibility that an originally-desired patch reading area cannot be secured and an accurate signal value cannot be obtained. In addition to a change in the page layout, for example, in a case where printing is performed with such a setting as "PRINT ACCORDING TO SHEET", there is a possibility that a transformed chart is printed since the chart may be printed in a size different from the originally-desired size of the chart. In a case where such a transformed chart is printed by the objective device, the color matching process is not properly performed since an accurate signal value cannot be obtained. Therefore, the color matching process is cancelled. In the present embodiment, an explanation is also given of the example in which, in a case where the color matching process is not properly performed, the user is notified of the cause for the cancellation of the color matching process and the handling method thereof.

<System Configuration>

Figure 1B:
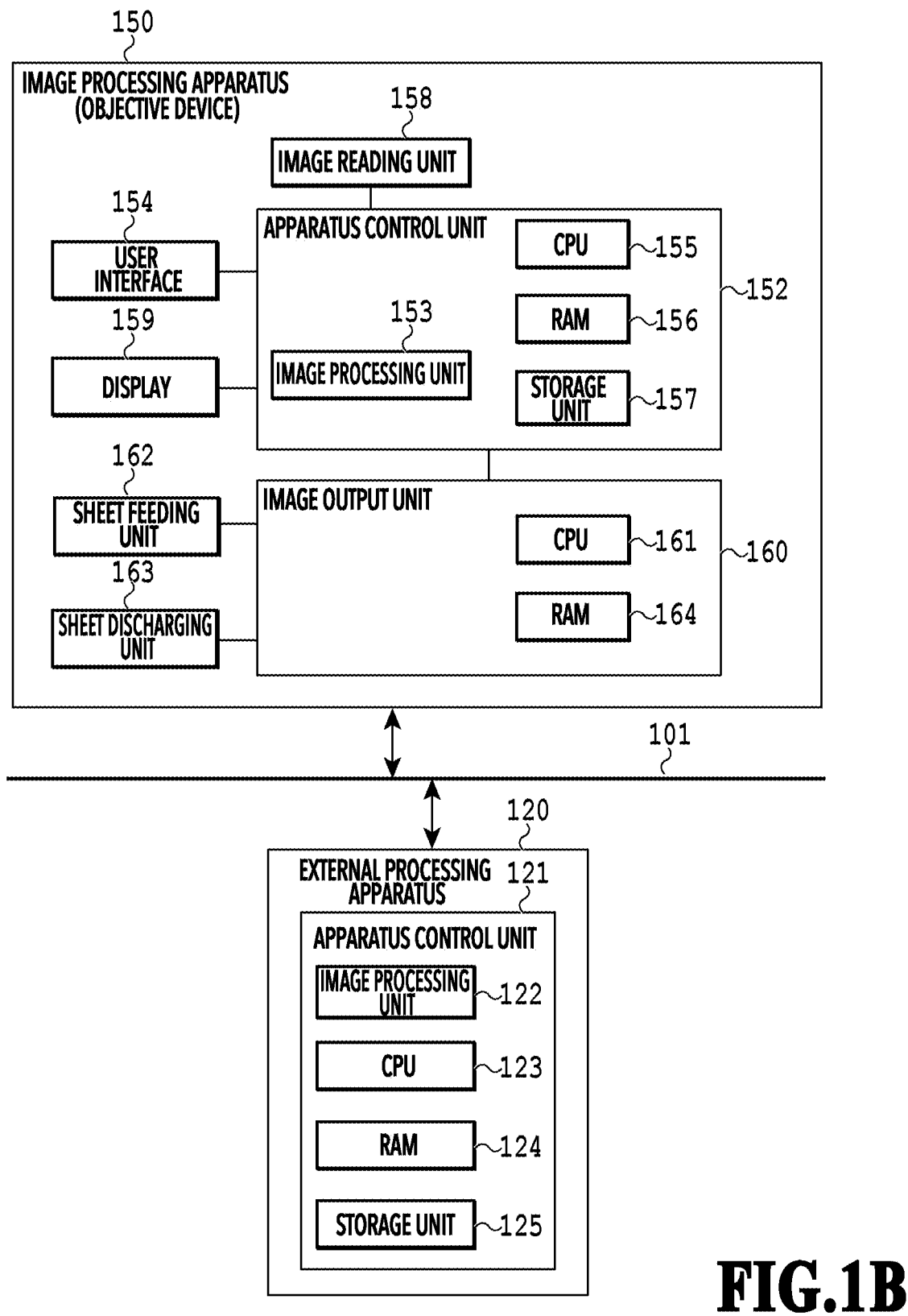

FIGS. 1A and 1B are totally a block diagram illustrating an example of a system configuration in the present embodiment. The system of the present embodiment includes an image processing apparatus 100 (hereinafter referred to as an adjustment target device 100) and an image processing apparatus 150 (hereinafter referred to as an objective device 150). Then, a process of matching the color reproduction characteristics of the adjustment target device 100 with the color reproduction characteristics of the objective device 150 is performed. Although the example in which the adjustment target device 100 and the objective device 150 are connected to each other via the network 101 is illustrated in FIGS. 1A and 1B, such a network connection is not necessary.

First, an explanation is given of the configuration of the adjustment target device 100, which is an image processing apparatus. The adjustment target device 100 includes an apparatus control unit 102, an image output unit 110, a user interface 104, an image reading unit 108, a display 109, a sheet feeding unit 112, and a sheet discharging unit 113. The apparatus control unit 102 includes an image processing unit 103, a CPU 105, a RAM 106, and a storage unit 107. The image output unit 110 includes a CPU 111 and a RAM 114. In the present embodiment, a user interface is referred to as a UI.

The UI 104 is configured with, for example, a keyboard, a mouse, or other input/output devices, and the UI 104 is capable of inputting various kinds of setting values or designated values.

The apparatus control unit 102 is configured with a controller base, and each of the devices including the CPU 105, the RAM 106, the storage unit 107, and the image processing unit 103 is mounted on the apparatus control unit 102. The CPU 105 reads a main program from the storage unit 107 and stores the main program in the RAM 106 according to an initial program in the storage unit 107. The RAM 106 is used as a main memory for storing a program or for a work. The CPU 105 controls the apparatus control unit 102 according to the main program stored in the RAM 106.

The image processing unit 103 is configured with an ASIC that processes image data, and the image processing unit 103 performs image processing on print data transmitted from a printer driver of a PC via the network 101 or on image data obtained by the image reading unit 108. Details of the image processing unit 103 are described later.

The image reading unit 108 irradiates a bundle of original document images or a sheet of original document image with a light source (not illustrated in the drawings), so that the original reflected image is imaged through a lens onto a solid-state image sensing device such as a CCD (Charge Coupled Device) sensor. Then, the image reading signals obtained from the solid-state image sensing device are obtained as image data. The adjustment target device 100 also includes an auto document feeder (hereinafter referred to as an ADF), which is not illustrated in the drawings, for obtaining image data at once in a case where an original document has multiple pages.

The storage unit 107 saves image data processed by the image processing unit 103, print data transmitted from a printer driver of a PC, and the like. The display 109 displays various kinds of UI screens.

The image output unit 110 is a printer unit, which is connected to the apparatus control unit 102 and is configured to form output data on paper by use of color toner such as cyan, magenta, yellow, black (hereinafter referred to as C, M, Y, and K), based on image data processed by the image processing unit 103. Print control of the image output unit 110 is performed by the apparatus control unit 102. The image output unit 110 is configured with a controller base, and each of the devices including the CPU 111 and the RAM 114 is mounted on the image output unit 110. The image output unit 110 is controlled by the CPU 111 and is connected to each of the sheet feeding unit 112 that feeds paper and the sheet discharging unit 113 that discharges paper on which output data is formed.

The objective device 150 includes an apparatus control unit 152, an image output unit 160, a UI 154, an image reading unit 158, a display 159, a sheet feeding unit 162, and a sheet discharging unit 163. The apparatus control unit 152 includes an image processing unit 153, a CPU 155, a RAM 156, and a storage unit 157. The image output unit 160 includes a CPU 161 and a RAM 164. Since the respective configurations in the objective device is the same as those in the adjustment target device 100, the explanations thereof are omitted.

The above-explained image processing apparatuses are merely examples and are not limited to the adjustment target device 100 and the objective device 150. Furthermore, it is also possible that a part of the functions of the image processing apparatuses is executed by an external processing apparatus 120 by mutual communication via a network.

The external processing apparatus 120 may be implemented by a computer apparatus such as a server or may be implemented by a cloud server on the Internet. The external processing apparatus 120 includes an apparatus control unit 121, and the apparatus control unit 121 includes a CPU 123, a RAM 124, and a storage unit 125. Since each of these configurations is the same as that of the adjustment target device 100, the explanation thereof is omitted. Other configurations may be further included, as necessary.

The PC 130 is an information processing apparatus used by the user, and the PC 130 includes a CPU 131, a RAM 132, a storage unit 133, and a printer driver 134. The PC 130 is capable of mutually communicating with the adjustment target device 100, the objective device 150, and a web server 140 via the network 101.

The CPU 131 reads a main program from the storage unit 133 and stores the main program in the RAM 132 according to an initial program in the storage unit 133. The RAM 132 is used as a main memory for storing a program or for a work. The CPU 131 controls an application used by the user or the printer driver 134 according to the main program.

The printer driver 134 transmits image data, which is loaded by an application used by the user, as well as print settings, which are set by the user in a case of printing, to the adjustment target device 100 or the objective device 150 as print data.

The web server 140 includes a CPU 141, a RAM 142, and a storage unit 143. The web server 140 is a server that transmits data corresponding to information requested from the web browser of the PC 130 on the client side via the network 101.

The CPU 141 reads a main program from the storage unit 143 and stores the main program in the RAM 142 according to an initial program in the storage unit 143. The RAM 142 is used as a main memory for storing a program or for a work. According to the main program, the CPU 141 performs control for interpreting a request from the PC 130 used by the user, confirming the information corresponding to the request, and responding to the PC 130.

In a case where the web server 140 is requested to download a file such as image data, based on information of a request from a web browser, the web server 140 can communicate with the later-described DB server 170 to obtain the file.

The DB server 170 includes a storage unit 173. The DB server 170 is a server that communicates with the web server 140 via a network. In a case where a request for downloading an image file is provided by the web server 140, the DB server 170 can transmit the corresponding file, which is stored in advance in the storage unit 173, to the web server 140.

<Color Matching Process>

FIG. 2 is a diagram illustrating an overall sequence of the color matching process in the present embodiment. With reference to FIG. 2, an explanation is given of a sequence in which the user obtains a color characteristic chart by use of the PC 130, prints the obtained color characteristic chart with the objective device 150, and performs the color matching process with the adjustment target device 100 by use of the printed color characteristic chart.

The processes of FIG. 2 are respectively executed by the devices in response to the user 201 operating the PC 130, the objective device 150, and the adjustment target device 100. For the processes of the PC 130, a program code stored in the storage unit 133 is loaded into the RAM 132 and executed by the CPU 131. For the processes of the adjustment target device 100, a program code stored in the storage unit 107 is loaded into the RAM 106 and executed by the CPU 105 controlling the apparatus control unit 102. For the processes of the objective device 150, a program code stored in the storage unit 157 is loaded into the RAM 156 and executed by the CPU 155 controlling the apparatus control unit 152. Further, in the overall sequence diagram, for convenience of explanation, the operations by the user 201 are also included in the processes (step sequences (SQ)) (hereinafter, the same applies to the various sequence diagrams in the present specification).

First, in SQ210, the PC 130 is operated by the user 201 to obtain a color characteristic chart. Then, in SQ211, the PC 130 provides a request for image data of the corresponding color characteristic chart to the web server 140. The operation by the user to obtain the image data of a color characteristic chart in the present embodiment is performed through such a web browser as illustrated in FIG. 3.

Figure 3:
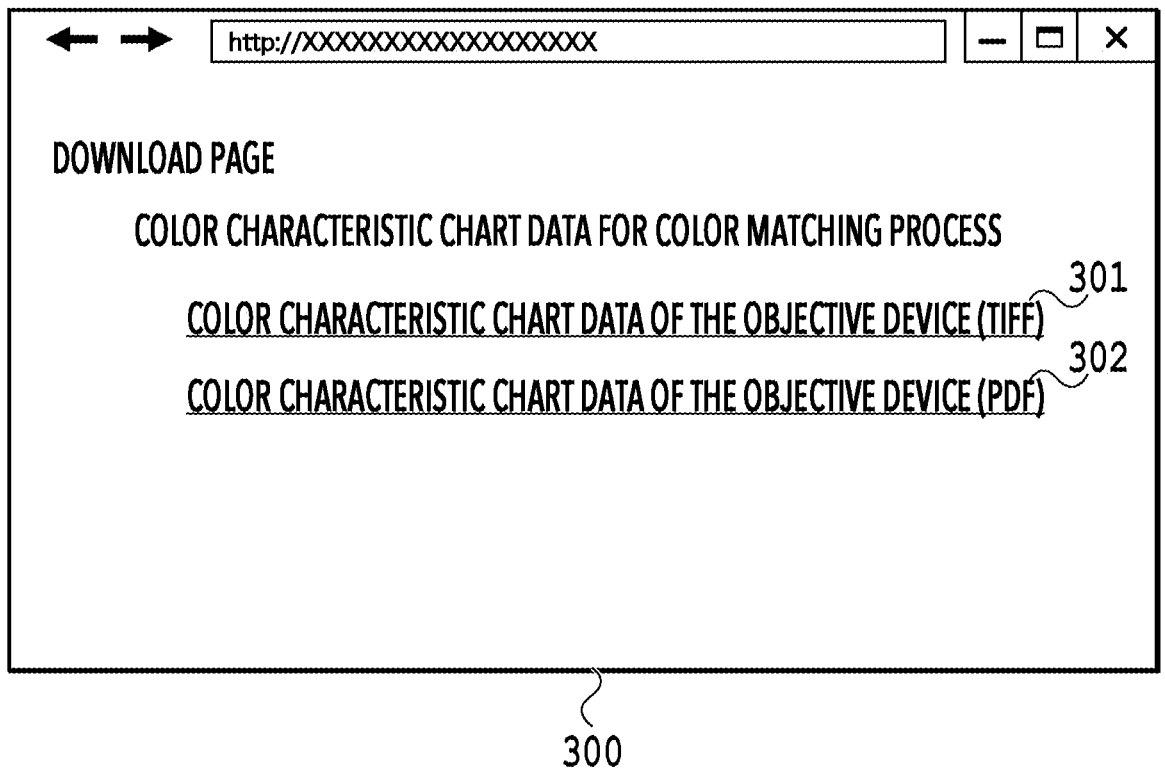
FIG. 3 is a diagram illustrating an example of a screen of a web browser.

FIG. 3 is a diagram illustrating an example of a screen of the web browser 300 that is activated on the PC 130. On the web browser 300, a page for downloading a color characteristic chart to the PC 130 is displayed. This page is a page held by the web server 140. On the screen of FIG. 3, a product information web page for the adjustment target device 100 is illustrated, and the page is displayed so that a color characteristic chart can be downloaded. The label 301 and the label 302 are UI components to be pressed by the user 201 in a case of downloading image data of a color characteristic chart. The web server 140 requests the DB server 170 for printer driver or color characteristic chart data corresponding to each label. Although the web browser 300 in the present embodiment is configured as illustrated in FIG. 3, it is possible to change the screen configuration, depending on the type of the web browser or the display device. In addition, it is assumed that the image data of the color characteristic chart in the present embodiment is TIFF (Tagged Image File Format) or PDF (Portable Document Format). However, it is also possible to perform the processes by use of an image data format other than TIFF and PDF. The image data of the color characteristic chart in the present embodiment is multi-valued image data including red, green, and blue (hereinafter referred to as R, G, and B).

Figure 4:
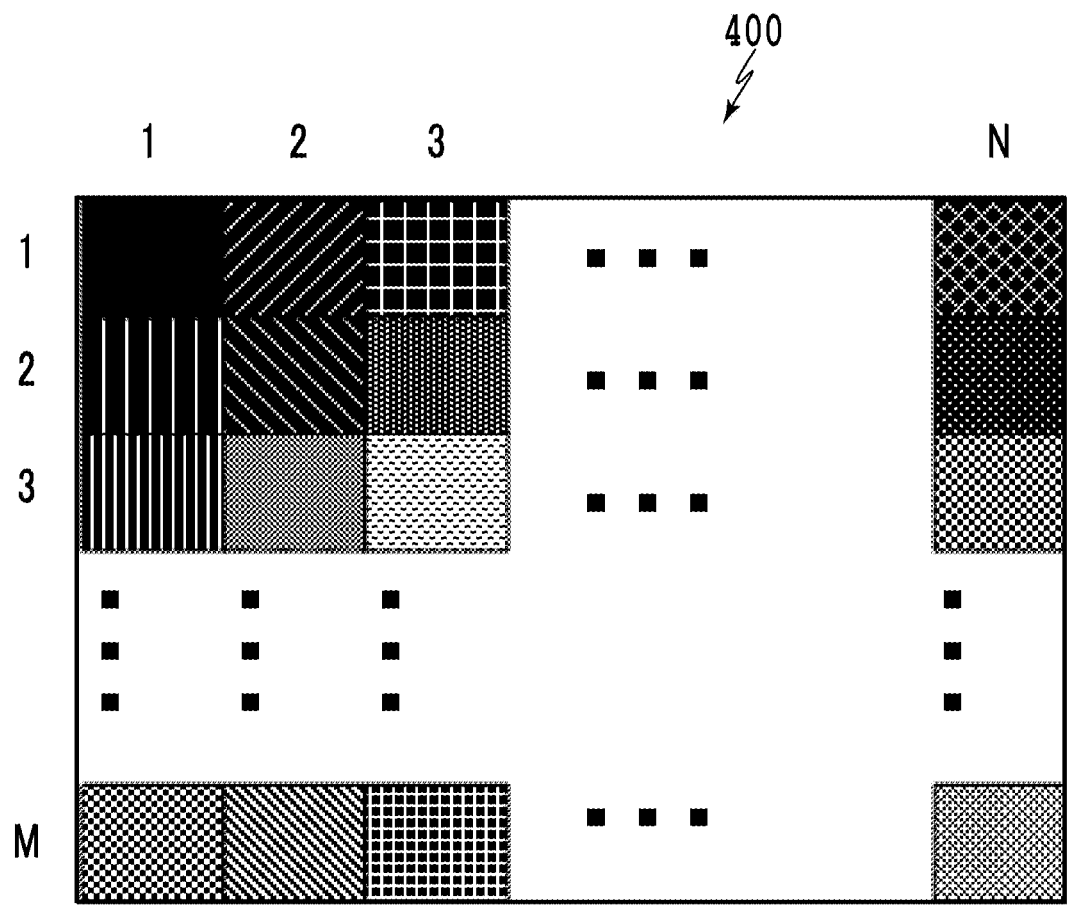
FIG. 4 is a diagram illustrating an example of the image data of a color characteristic chart to be printed on a sheet.

FIG. 4 is a diagram illustrating an example of the image data 400 of the color characteristic chart to be printed on a sheet for confirming the color characteristics in the present embodiment. As illustrated in FIG. 4, the image data 400 of the color characteristic chart is image data having a configuration in which images of rectangular areas called patches are arranged in accordance with M rows and N columns. A patch is an image having the same RGB value in a rectangular area. It is assumed that the signal values of the patches in the color characteristic chart of the present embodiment are represented by signal values sampled at equal intervals in the sRGB color space, which is one of the color spaces that are independent from the color space of devices. The image data of the color characteristic chart in the present embodiment is assumed to be held as a file in an image data format. Thereby, the image data of the color characteristic chart can be printed by the printer driver 134 of the PC 130 and an application (not illustrated in the drawings) used by the user, so that it is possible to use the color settings desired to be inherited by the adjustment target device of the user. Although the image data in the present embodiment is TIFF, any file can be used as long as the file is in an image data format that can be read by the application used by the user.

As described later, this color characteristic chart is to be printed by the objective device 150 and scanned by the adjustment target device 100. That is, the color characteristic chart is an output printed by the objective device 150, based on the image data 400 of patches represented by signal values sampled at equal intervals in the sRGB color space. A color conversion process is performed by the objective device 150 on image data of a color characteristic chart by use of the color settings to achieve the representation desired by the user, and the above-described color characteristic chart is printed by the image output unit 160 of the objective device 150 by use of the image data after the color conversion. The color settings to achieve the desired representation in the present embodiment correspond to settings related to colors, such as a setting of a method for matching color profiles that determine the color reproduction characteristics of a device at the time of output from the driver. However, any setting may be applied as long as color adjustment can be performed. Furthermore, the sRGB color space is an international standard of a color space, which is established by IEC (International Electrotechnical Commission), and is a color space defined to ensure color reproducibility between different environments such as input/output devices. The color matching process is performed by use of scanned image data that is obtained by scanning a color characteristic chart printed by the objective device 150, based on image data on which a color conversion process has been performed according to such color settings being used in the objective device 150 as described above. Details are described later.

The above-described "signal values sampled at equal intervals in the sRGB color space" in the present embodiment are signal values representing R, G, and B with 8 bits, respectively, and the interval of the signal values is 32.

Returning to FIG. 2, the explanation of the sequence continues. Next, in SQ212, the web server 140 requests the DB server 170 for the image data of the corresponding color characteristic chart. Next, in SQ213, the DB server 170 obtains the image data of the color characteristic chart requested in SQ212 from the storage unit 173. Next, in SQ214, the DB server 170 transmits the image data of the color characteristic chart obtained in SQ213 to the web server 140.

Next, in SQ215, the web server 140 transmits the image data of the color characteristic chart transmitted from the DB server 170 in SQ214 to the PC 130.

Next, in SQ216, upon completion of the reception of the image data of the color characteristic chart from the web server 140 in SQ215, the PC 130 notifies the user 201 of completion of obtaining the image data of the color characteristic chart via the web browser. Although it is assumed that the method for notifying the user of completion of the obtainment in the present embodiment is to display a pop-up, any method may be used as long as the user can be notified.

Next, in SQ220, the PC 130 receives, from the user 201, an operation of an instruction for printing the image data of the color characteristic chart obtained in SQ216. Then, in SQ221, the PC 130 loads the image data of the color characteristic chart by use of the corresponding application.

Next, in SQ222, the PC 130 transmits, to the objective device 150 via the printer driver 134, the image data of the color characteristic chart loaded in SQ221 as well as the print instruction including setting information related to colors that can be set by the printer driver 134. The setting information that can be set by the printer driver 134 in the present embodiment is print settings related to color processing such as density adjustment or a color mode. Here, it is assumed that the print settings related to color processing, which are usually used by the user for printing with the objective device 150, are reflected.

Next, in SQ223, the objective device 150 performs a color conversion process on the image data of the color characteristic chart received in SQ222 according to the color setting information received from the PC 130 in SQ222, and the objective device 150 prints the color characteristic chart with the image output unit 160. Next, in SQ224, the objective device 150 notifies the PC 130 that the printing of the color characteristic chart is completed in SQ223.

Next, in SQ225, upon receiving the notification of completion of the printing from the objective device 150 in SQ224, the PC 130 notifies the user 201 of the completion of the printing via the application.

In the present embodiment, the printer driver and the application that loads the image data of the color characteristic chart are the printer driver 134 and the application that the user uses in a case of printing with the objective device 150. By executing SQ220 to SQ223, the tints currently represented by the objective device 150 can be printed as the color characteristic chart.

Figure 5:
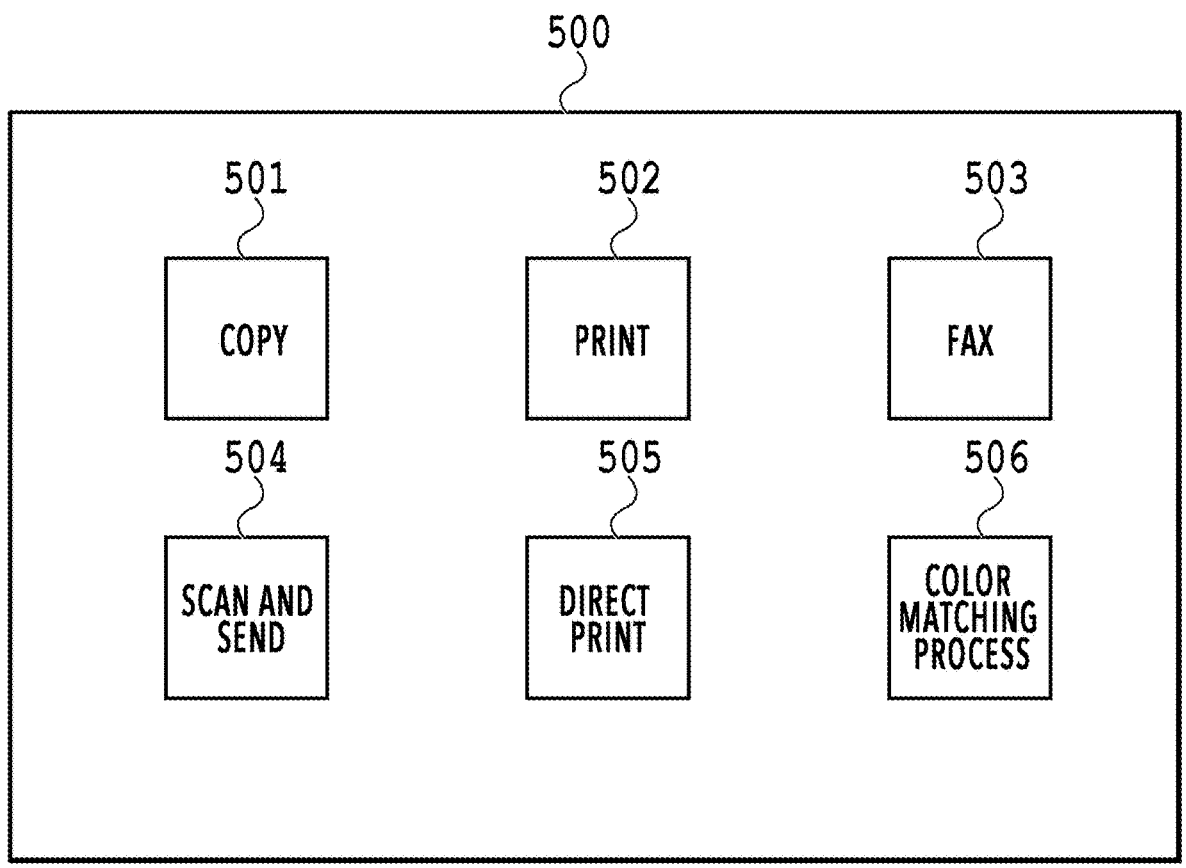
FIG. 5 is a diagram illustrating an example of the initial window displayed on the display of an adjustment target device.

Next, in SQ230, the adjustment target device 100 receives, from the user 201, an operation of an instruction for executing the color matching process. FIG. 5 is a diagram illustrating an example of the initial window displayed on the display 109 of the adjustment target device 100. The instruction by the user 201 for executing the color matching process is input to the adjustment target device 100 through the UI 500 illustrated in FIG. 5.

In the UI 500 of FIG. 5, the buttons 501 through 506 are buttons to be pressed in a case where the user executes each function of the adjustment target device 100, which is an MPF. The function corresponding to the pressed button is executed according to a program. In the present example, the color matching process is executed in a case where the user presses the button 506. Although an instruction for executing each function of the image processing apparatus is provided in the button format in the present embodiment, it is also possible that each function is displayed in a list structure.

Next, in SQ231, by use of the ADF (not illustrated in the drawings) mounted on the image reading unit 108, the adjustment target device 100 scans the color characteristic chart printed by the objective device 150 in SQ223.

In FIGS. 6A through 6D, examples of a UI displayed on the adjustment target device 100 are illustrated. In FIG. 6A, the UI 600 displayed on the display 109 in a case where the button 506 is pressed by the user is illustrated. In the UI 600, the example in which the user 201 is instructed to place the color characteristic chart, which is printed by the objective device 150, on the ADF mounted on the image reading unit 108 is illustrated. The button 601 is a button to be pressed by the user after the printed color characteristic chart is placed on the ADF mounted on the image reading unit 108. In a case where the button 601 is pressed by the user, the adjustment target device 100 instructs the image reading unit 108 to execute the scan process. It is also possible that the adjustment target device 100 is configured not to instruct the image reading unit 108 to execute the scan process in a case where the button 601 is pressed by the user in a state where a printed color characteristic chart is not placed on the ADF, which is mounted on the image reading unit 108. The button 602 is a button to be pressed by the user in a case of cancelling the scan process of SQ231. In a case where the button 602 is pressed by the user, the adjustment target device 100 cancels the execution of the color matching process, so that the screen transitions to the initial window, which is the UI 500 in FIG. 5.

Next, in SQ232, the adjustment target device 100 performs printing with the image output unit 110 by use of image data of a color characteristic chart internally saved in advance. Although details regarding the printing are to be described later, it is possible to confirm the color characteristics of the adjustment target device 100 by printing the image data of a printing characteristic chart with the adjustment target device 100 in SQ232.

In FIG. 6B, an example of the UI 610 for instructing the user 201 to set a sheet in a sheet feed cassette in order to print the image data of a color characteristic chart is illustrated. In FIG. 6B, the UI 610 for providing an instruction for printing in SQ232 is illustrated. In the UI 610, the button 611 is a button to be pressed by the user in a case of printing the image data of the color characteristic chart by use of the sheet that is set in the sheet feeding unit 112. In a case where the user presses the button 611, the adjustment target device 100 instructs the image output unit 110 for executing the print process by use of the sheet that is set in the sheet feeding unit 112. It is also possible that the adjustment target device 100 is configured not to instruct the image output unit 110 to execute the print process in a case where the button 611 is pressed by the user in a state where a printable sheet is not set in any of the sheet feed cassettes (not illustrated in the drawings) of the sheet feeding unit 112. The button 612 is a button to be pressed by the user in a case of cancelling the print process of SQ232. In a case where the button 612 is pressed by the user, the adjustment target device 100 cancels the execution of the print process and returns to SQ231, so that the screen transitions to the UI 600. It is also possible that, in a case where the button 612 is pressed, execution of the color matching process is cancelled, so that the screen transitions to the initial window, which is the UI 500 of FIG. 5.

The text 613 in the UI 610 is a text displayed for the setting of the sheet feed cassette of the sheet feeding unit 112 to be used for the printing of the image data of the color characteristic chart. The printable sheet size in the present embodiment is A4 or A3, and, in the text 613, the sheet feed cassette in which the printable paper is set is displayed. In a case where there are multiple sheet feed cassettes in which a printable sheet is set, the initial value corresponds to the sheet feed cassette on the top. In a case where a printable sheet is not set in any of the sheet feed cassettes, "NONE" is displayed. The button 614 is a button to be pressed by the user 201 in a case of changing the sheet feed cassette displayed in the text 613. In a case where the button 614 is pressed by the user, the screen transits to a UI in which a sheet feed cassette can be selected from among the sheet feed cassettes in which a printable sheet is set, so that the sheet feed cassette to be used for printing can be changed.

Next, in SQ233, by use of the image reading unit 108, the adjustment target device 100 scans the color characteristic chart printed by the adjustment target device 100 in SQ232. In FIG. 6C, an example of the UI 620 for instructing the user 201 to place the color characteristic chart, which is printed by the adjustment target device 100, on the ADF mounted on the image reading unit 108 is illustrated. In FIG. 6C, the UI 620 for providing an instruction for scanning in SQ233 is illustrated. The button 621 is a button to be pressed by the user after the printed color characteristic chart is placed on the ADF mounted on the image reading unit 108. In a case where the button 621 is pressed by the user, the adjustment target device 100 instructs the image reading unit 108 to execute the scan process. It is also possible that the adjustment target device 100 is configured not to instruct the image reading unit 108 to execute the scan process in a case where the button 621 is pressed by the user in a state where a printed color characteristic chart is not placed on the ADF. The button 622 is a button to be pressed by the user in a case of cancelling the scan process of SQ233. In a case where the button 622 is pressed by the user, the adjustment target device 100 cancels the execution of the color matching process, so that the screen transitions to the initial window, which is the UI 500 in FIG. 5.

Next, in SQ234, the adjustment target device 100 executes color matching process for enabling the adjustment target device 100 to represent the color characteristics of the objective device 150 by use of the color characteristic charts scanned in SQ231 and SQ233. In the present embodiment, by the color matching process of SQ234, a conversion Look-Up Table (LUT) is created as color adjustment information for the adjustment target device 100 to represent colors similar to those of the objective device 150. In the present embodiment, the conversion LUT created by the color matching process of SQ234 is referred to as a color adjustment LUT. The color adjustment LUT is configured as a table indicating the relationship between the input values that are sampled at equal intervals in the sRGB color space and the output values of the RGB color space that is dependent on the adjustment target device, which correspond to the input values, respectively. The RGB color space the is dependent on the adjustment target device in the present embodiment is referred to as a devRGB color space. It is assumed that the color adjustment LUT is saved in a format that can be applied to the CMS. Details related to the color matching process of SQ234 are described later.

In the present embodiment, the name of the color adjustment LUT created by the color matching process of SQ234 can be set by the user. In FIG. 6D, an example of a UI of the adjustment target device 100 for providing an instruction for inputting the name of the setting to be saved is illustrated. The UI 650 of FIG. 6D is a UI displayed in a case where the process of SQ234 is completed. In the UI 650, the text box 651 is a text box for inputting and displaying the name for saving the created color adjustment LUT. In a case where the text box 651 is pressed by the user 201, the screen transitions to a UI screen (not illustrated in the drawings) for inputting the name of the created color adjustment LUT. Although the method for inputting the name in the present embodiment is assumed to be a method in which a software keyboard is displayed on the UI for an input, it is also possible that the name is input by use of an external input device.

The button 652 is a button to be pressed by the user after the user 201 completes the input of the name to be saved. In a case where the user presses the button 652, the adjustment target device 100 saves the created color adjustment LUT according to the setting name described in the text box 651. The button 653 is a button to be pressed by the user in a case of cancelling the color matching process of SQ234. In a case where the button 653 is pressed by the user, the adjustment target device 100 cancels the execution of the color matching process, so that the screen transitions to the initial window, which is the UI 500 in FIG. 5.

Next, upon receiving a notification of completion of the color matching process in SQ234, the adjustment target device 100 notifies the user 201 of the completion of the color matching process by use of the display 109 in SQ235.

The above is the explanation of the overall flow of the color matching process performed by the adjustment target device 100 in the present embodiment. As a result, a color adjustment LUT representing the color characteristics of the objective device 150 is created, and the adjustment target device 100 is enabled to represent the color characteristics of the objective device 150.

Figure 7A:
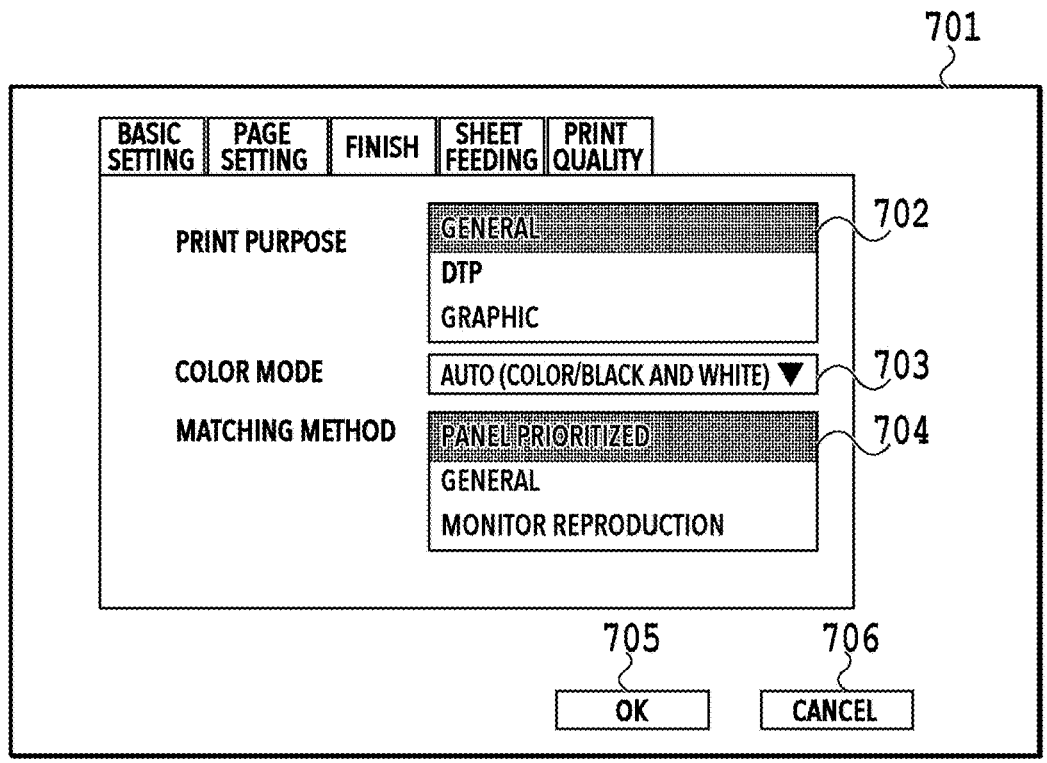
FIGS. 7A and 7B are diagrams illustrating an example of a change in a UI of a printer driver.
Figure 7B:
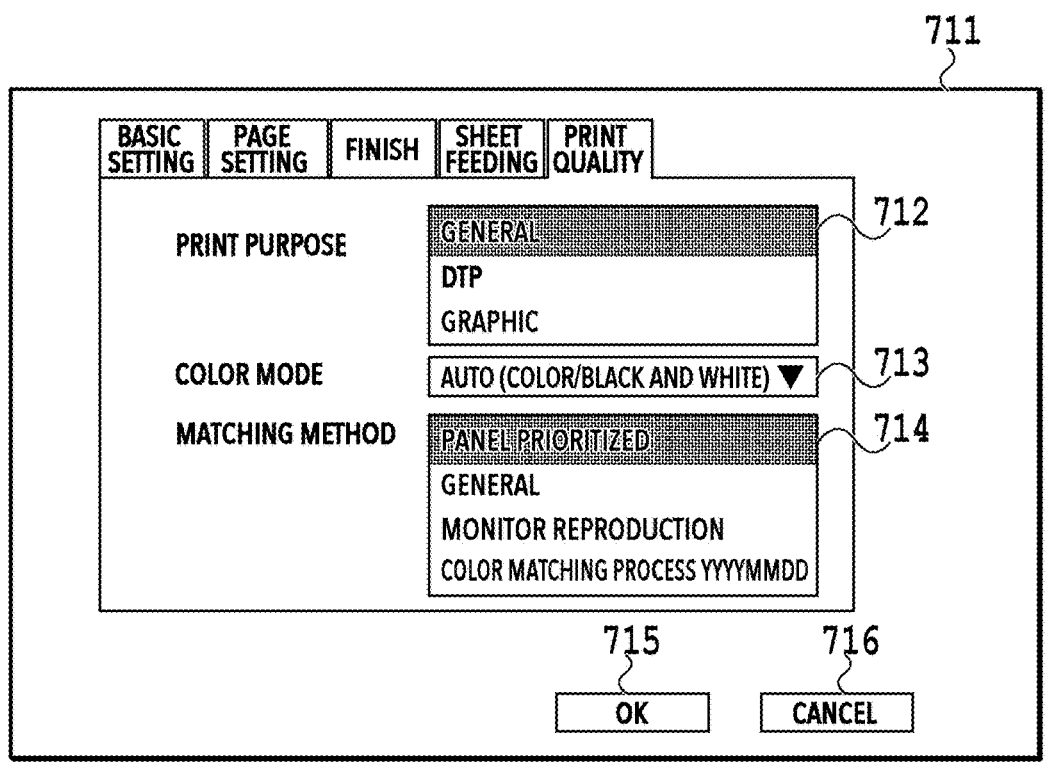

FIGS. 7A and 7B are diagrams illustrating an example of a change in a UI of the printer driver 134 of the PC 130 before and after the color matching process in the present embodiment. The UI 701 of FIG. 7A is an overall UI for performing print settings related to print quality with the printer driver 134, which is before the color matching process is performed. On the other hand, the UI 711 of FIG. 7B is an overall UI for performing print settings related to print quality with the printer driver 134, which is after the color matching process is performed. It is assumed that the UI 711, which is after the color matching process in the present embodiment is performed, is in a state where the printer driver 134 has already obtained the latest information related to the print settings from the adjustment target device. There is a method in which the printer driver 134 obtains the latest setting information after the printer driver 134 receives an instruction for obtaining the latest setting information from the user 201. However, the method is not limited as such. As long as the latest setting information of the adjustment target device 100 can be obtained, any method may be used, such as a method in which the printer driver 134 obtains the latest setting information every time the printer driver 134 is used, regardless of an instruction from the user, or a method in which the latest setting information is obtained after a predetermined time period elapses.

The list box 702 and the list box 712 are a list box for performing settings related to the purpose of printing and for collectively setting the related print items corresponding to the item selected as the print purpose.

The list box 703 and the list box 713 are a list box for performing settings related to the color mode for printing, so that the image processing performed by the printer driver and the image processing apparatus is changed according to the color mode that is set. Upon being selected by the user, setting items (not illustrated in the drawings) are expanded, so that each setting item can be selected.

The list box 704 and the list box 714 are a list box for setting a color profile or a color adjustment LUT to be applied to the CMS for printing. Therefore, depending on the matching method that is set, the color profile and the color adjustment LUT applied for color conversion performed by the CMS are changed. In a case where the color matching process is performed in SQ234, the saved name is displayed as in the list box 714 in a selectable manner. In a case where "PANEL PRIORITIZED" is selected, the later-described item selected in the adjustment target device 100 is to be applied.

The buttons 705 and 715 are a button to be pressed in a case where the setting related to the print setting of the printer driver 134 is completed and the user instructs the adjustment target device 100 for performing a print process. In a case where the user presses the button 705 and the button 715, the display of the UI 701 and the UI 711 ends. Then, the adjustment target device 100 applies each of the setting items related to the printing and executes the process for printing. The buttons 706 and 716 are a button to be pressed by the user in a case of cancelling the printing with the adjustment target device 100. In a case where the user presses the button 706 and the button 716, the display of the UI 701 and the UI 711 ends.

Regarding the list box 702 and the list box 712 as well as the list box 704 and the list box 714, it is assumed that the setting items to be applied for printing in the present embodiment are illustrated with a gray background color (indicated by hatching). Furthermore, regarding the list box 703 and the list box 713, the setting item to be applied for printing in the present embodiment are the item displayed in the closed state after the setting is completed by the user.

Figure 8A:
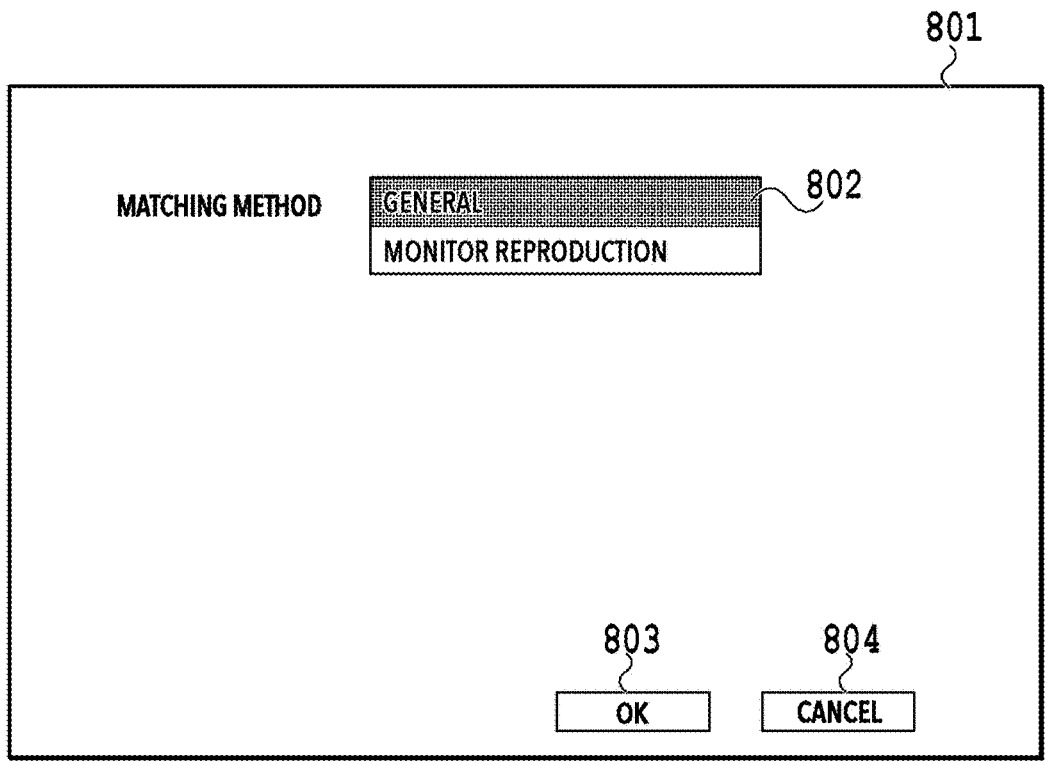
FIGS. 8A and 8B are diagrams illustrating an example of a change in a UI of the adjustment target device.
Figure 8B:
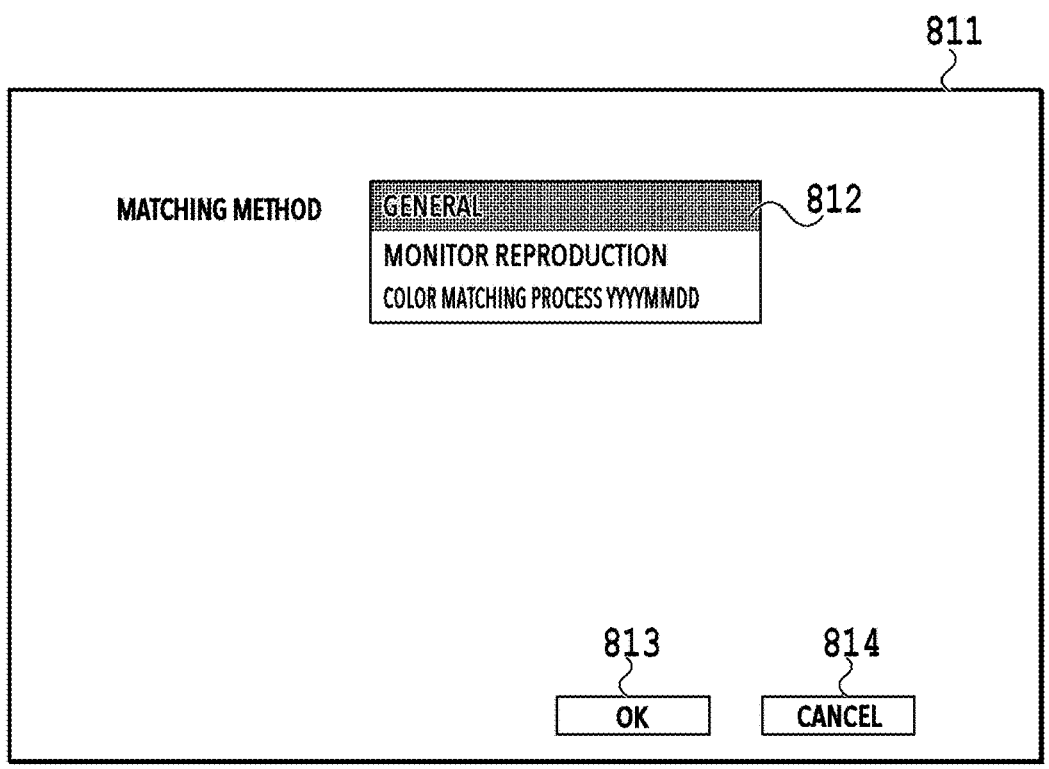

FIGS. 8A and 8B are diagrams illustrating an example of a change in a UI for setting the profile to be applied to the CMS in the adjustment target device 100 before and after the color matching process in the present embodiment is performed. The UI 801 in FIG. 8A is an overall UI for setting a color profile or a color adjustment LUT to be applied to the CMS in the adjustment target device 100, which is before the color matching process is performed. On the other hand, the UI 811 in FIG. 8B is an overall UI for setting a color profile or a color adjustment LUT to be applied to the CMS in the adjustment target device 100, which is after the color matching process is performed. The UIs 801 and 811 are a UI to be displayed on the display 109 in a case where the user instructs the adjustment target device 100 to set the color profile or the color adjustment LUT to be applied to the CMS.

The list box 802 and the list box 812 are a list box for setting a profile to be applied to the CMS for printing. Therefore, depending on the matching method that is set in the list box, the color profile or the color adjustment LUT to be applied for color conversion performed by CMS is changed. In a case where the color matching process is performed in SQ234, the saved name is displayed in a selectable manner, as in the list box 714 of the printer driver 134.

Regarding the list box 802 and the list box 812, it is assumed that the setting item to be applied for printing in the present embodiment is illustrated with a gray background color (hatching).

The button 803 and the button 813 are a button to be pressed in a case of applying the item that is set by the user after the setting of the color profile or the color adjustment LUT to be applied to the CMS is completed. In a case where the user presses the button 803 and the button 813, the display of the UI 801 and the UI 811 ends, and each setting item related to printing is applied to the adjustment target device 100.

The buttons 804 and 814 are a button to be pressed by the user in a case of cancelling the setting of the color profile or the color adjustment LUT to be applied to the CMS. In a case where the user presses the button 804 and the button 814, the display of the UI 801 and the UI 811 ends, and the items before the setting are applied.

<Flowchart of the Color Matching Process by the Adjustment Target Device>

Figures 9, 9A:
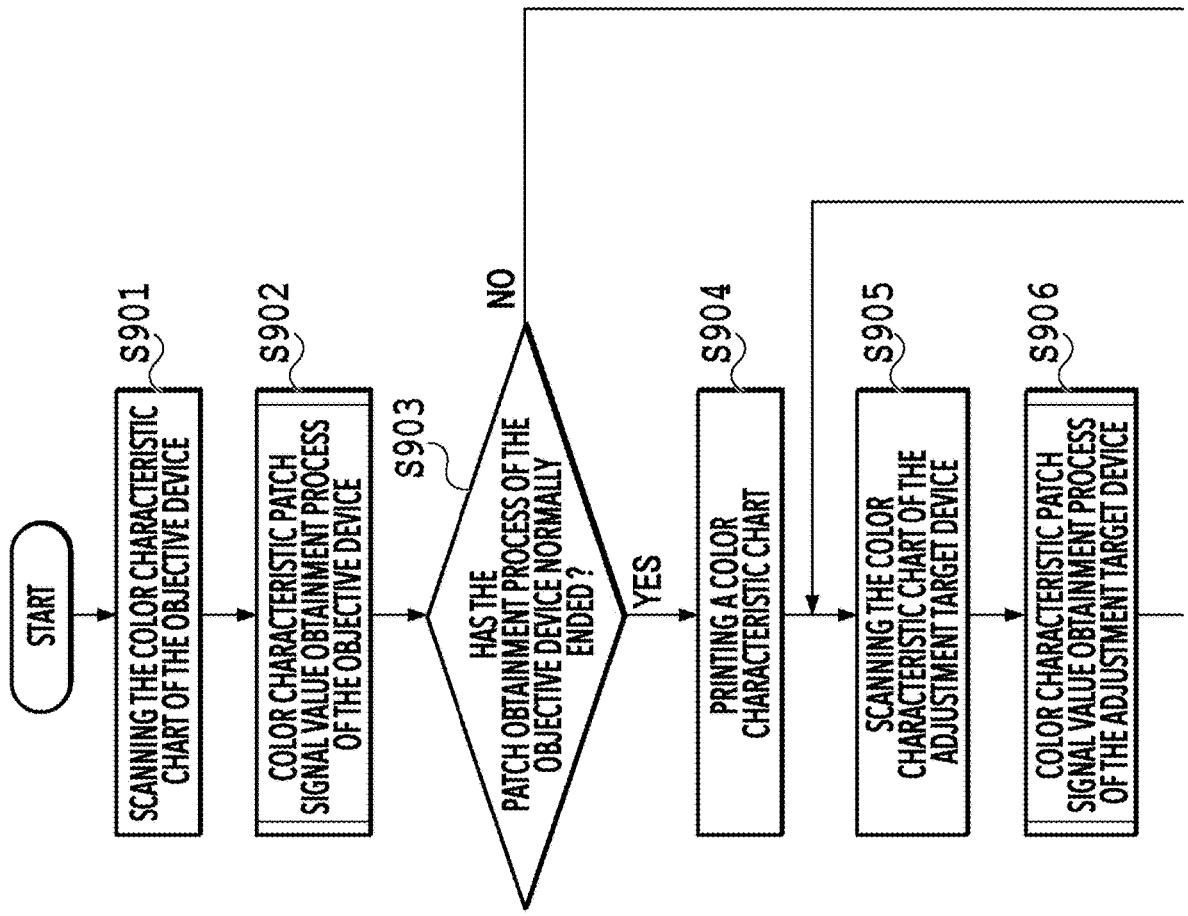

FIGS. 9A and 9B are totally a flowchart illustrating an example of the color matching process in the adjustment target device 100 of the present embodiment. FIGS. 9A and 9B are totally a flowchart illustrating the overall color matching process performed by the adjustment target device 100, which is executed in a case where an instruction for the color matching process is provided by the user. For the processes in the flowchart illustrated in FIGS. 9A and 9B, a program code stored in the storage unit 107 is loaded into the RAM 106 and executed by the CPU 105 controlling the apparatus control unit 102. It is assumed that the data created during the processes is temporarily stored in the storage unit 107. The symbol "S" in the explanation of each process means that it is a step in the flowchart (the same applies hereinafter in the present specification).

In S901, the apparatus control unit 102 scans the color characteristic chart, which is printed by the image output unit 160 of the objective device 150, with the image reading unit 108, in order to obtain scanned image data. That is, the image reading unit 108 of the adjustment target device 100 scans the color characteristic chart printed by the objective device 150. It is assumed that the scanned image data in the present embodiment is multi-valued RGB image data. The process of S901 is the same as the process of SQ231 of FIG. 2. That is, the adjustment target device 100 scans the color characteristic chart printed and output by the objective device 150 using the image data 400 of such a color characteristic chart as illustrated in FIG. 4. In other words, the color characteristic chart is an output printed by the objective device 150, based on the image data of patches represented by signal values sampled at equal intervals in the sRGB color space. That is, a color conversion process is performed by the objective device 150 on image data of a color characteristic chart by use of the color settings to achieve the representation desired by the user, and the above-described color characteristic chart is printed by the image output unit 160 of the objective device 150 by use of the image data after the color conversion.

Next, in S902, the apparatus control unit 102 obtains the RGB values of each patch in the color characteristic chart by use of the scanned image data obtained in S901. Details of the patch signal value obtainment process for the color characteristic chart in S902 are described later. In S902, not only the process for obtaining the RGB values of each patch, a process of analyzing the cause for cancellation (S911, which is to be described later) of the color matching process due to a transformed chart printed by the objective device 150 and notifying the user of the cause is performed. Details are described later.

Next, in S903, the apparatus control unit 102 determines whether the patch signal value obtainment process for the color characteristic chart of the objective device, which is performed in S902, has normally ended. In a case where the patch signal value obtainment process has normally ended in S903, the processing proceeds to S904, and, otherwise, the processing proceeds to S911.

In S904, the apparatus control unit 102 performs printing of the image data of a color characteristic chart held in advance by use of the image output unit 110 of the adjustment target device 100. The image data of the color characteristic chart used for printing in S904 may be the same as the image data of the color characteristic chart which is the source of the scanned image data obtained by the objective device in S901 or may be different color characteristic chart data. In any cases, it is assumed that the signal values of the patches in the image data of the color characteristic chart of the adjustment target device are also represented by signal values sampled at equal intervals in the sRGB color space, which is one of the color spaces that are independent from the color space of devices.

The purpose of printing the color characteristic chart in S904 is to measure the color reproduction characteristics of the image output unit 110 of the adjustment target device. Therefore, in S904, printing is performed based on the RGB values of the respective patches of the image data of the color characteristic chart without performing the color conversion process by the CMS. Since the printing is performed based on the RGB values of the respective patches of the image data of the color characteristic chart without performing the color conversion by the CMS, the printing is performed based on the devRGB color space, which is dependent on the adjustment target device. In the present embodiment, the printing of the image data of the color characteristic chart by use of the image output unit 110 of the adjustment target device 100, which is performed in S904, is performed according to a predetermined print setting. That is, it is assumed that the page layout setting or a print setting such as the scaling ratio is fixedly performed with a given setting. The process of S904 is the same as the process of SQ232 of FIG. 2.

In a case where the patch signal value obtainment process has not normally ended in S903, the apparatus control unit 102 cancels the color matching process in S911. In a case where the patch signal value obtainment process has not normally ended in S903, the user is notified of a factor analysis result in the previous process of S902, as described later. Either the process of notifying the user of a factor analysis result or the process of cancelling the color matching process may be performed first, and both may be performed in parallel.

In S905, the apparatus control unit 102 controls the image reading unit 108 to scan the color characteristic chart, which is printed by the image output unit 110 of the adjustment target device 100 in S904, in order to obtain scanned image data. The process of S905 is the same as the process of SQ233 of FIG. 2.

In S906, the apparatus control unit 102 performs a process of obtaining the RGB values of each patch in the color characteristic chart by use of the scanned image data obtained by the adjustment target device 100 in S905.

Although details of the patch signal value obtainment process of the color characteristic chart in S906 is to be described later, not only the RGB values of the patches are obtained, but also a notification of whether the scanning of the color characteristic chart printed by the adjustment target device has normally ended is provided.

In S907, the apparatus control unit 102 determines whether the patch signal value obtainment process of the color characteristic chart of the adjustment target device, which is performed in S906, has normally ended. In a case where it is determined in S907 that the patch signal value obtainment process has not normally ended, the processing returns to S905. In a case where the process has normally ended, the processing proceeds to S908. In the present embodiment, even in a case where the patch signal value obtainment process of the color characteristic chart of the adjustment target device has not normally ended, the printing is not performed again. The color matching process can be re-started by re-scanning the color characteristic chart, which has already been printed in S904. This is because, unlike the later-described example regarding the objective device 150, for the print process of the color characteristic chart performed by the adjustment target device 100 in S904, the page layout setting or a print setting such as the scaling ratio is fixedly performed with given settings. In addition, as will be described later, the user is notified of a retry of the scanning in the process of S906. Therefore, it is expected that the user will re-execute the scanning. Accordingly, in a case where the patch signal value obtainment process of the color characteristic chart of the adjustment target device has not normally ended, the apparatus control unit 102 returns to S905, so as to perform the process of obtaining the scanned image data again.

The subsequent processes from S908 to S910 correspond to the color matching process performed in SQ234 of FIG. 2. In S908, the apparatus control unit 102 creates an LUT (the second LUT, which is to be described later) for converting sRGB signal values that are the source of a patch signal value into L*a*b* values in consideration of the characteristics of the objective device 150. The apparatus control unit 102 creates the second LUT by use of the color characteristic patch signal values of the objective device 150 obtained in S902. L*a*b* values are values on the L*a*b* color space, which is one of the device-independent color spaces created by CIE (International Commission on Illumination). The L*a*b* color space is a perceptually uniform color space in consideration of human vision characteristics and is a device-independent three-dimensional color space. The color characteristic patch signal values (RGB signal values) obtained in S902 are values that reflect the color characteristics of the objective device 150. By converting the color characteristic patch signal values (RGB signal values) into L*a*b* values, the L*a*b* values in consideration of the characteristics of the objective device 150 can be obtained.

As a method of converting the RGB signal values into the L*a*b* values in the present embodiment, there is a method of using an LUT (referred to as the first LUT) for outputting L*a*b* values corresponding to an input value, which is an RGB signal value read by the image reading unit 108 of the adjustment target device. The apparatus control unit 102 holds the first LUT in advance and performs the color conversion by use of the held first LUT. That is, the L*a*b* values corresponding to the color characteristic patch signal values (RGB values), which are obtained in S902 by printing with the objective device 150, are obtained by use of the first LUT that is held in advance. Accordingly, it is possible to obtain a data group of L*a*b* values indicating the color reproduction characteristics of the objective device 150 to be inherited. The data group of L*a*b* values indicating the color reproduction characteristics of the objective device 150 to be represented corresponds to the output values of the second LUT, which is to be described later.

Here, the respective patches of the image data of the color characteristic chart used in the printing by the objective device 150 are configured with "signal values sampled at equal intervals in the sRGB color space". That is, the input values (sRGB values) used by the objective device 150 for printing the respective patches of the color characteristic chart are known values. The apparatus control unit 102 refers to the first LUT to obtain the L*a*b* values corresponding to the color characteristic patch signal values (RGB values) of the first patch, for example. The apparatus control unit 102 sets the obtained L*a*b* values as the first output value of the second LUT. On the other hand, as the first input value corresponding to the first output value of the second LUT, the apparatus control unit 102 sets the sRGB values of the image data used for printing the first patch. Such processing as described above is performed for all patches. Accordingly, the LUT (second LUT) indicating the relationship between the input values of the sRGB color space and the L*a*b* values, which correspond to the input values and are obtained by converting the RGB values output from the objective device, is created.

Next, in S909, the apparatus control unit 102 creates an LUT (third LUT) for converting the color characteristic patch signal values (RGB signal values) of the respective patches of the adjustment target device, which are obtained in S906, to L*a*b* values in consideration of the characteristics of the adjustment target device. As a method for converting the RGB signal values into the L*a*b* values in the present embodiment, it is possible to use a method of conversion by use of a LUT (first LUT) similar to that in S908. Accordingly, it is possible to obtain a data group of L*a*b* values indicating the color reproduction characteristics of the adjustment target device based on the color characteristic chart printed by the adjustment target device.

As described above, the color characteristic chart of the adjustment target device is printed without performing a color conversion process by the CMS. Therefore, the color characteristic patch signal values of the respective patches of the adjustment target device, which are obtained in S906, are signal values in the RGB space that is dependent on the adjustment target device, that is, devRGB values. By converting all the patches in the color characteristic chart of the adjustment target device into L*a*b* values, the LUT (third LUT) indicating the relationship between the input values of the devRGB color space and the L*a*b* values, which correspond to the input values and are output from the adjustment target device, is created.

Next, in S910, the apparatus control unit 102 performs a process of creating the color adjustment LUT (fourth LUT), which is a conversion LUT for the adjustment target device to reproduce the same kind of colors as the objective device. The color adjustment LUT is configured as a table indicating the relationship between the input values sampled at equal intervals in the sRGB color space and the output values of the devRGB color space that is dependent on the adjustment target device, which correspond to respective input values.

An explanation is given of the process of creating the color adjustment LUT in S910 of the present embodiment. The color adjustment LUT is created by use of the second LUT created in S908 and the third LUT created in S909. First, the first L*a*b* value that is an output reflecting the color characteristics of the objective device 150 and corresponding to the first RGB value, which is an input value of the second LUT, is derived by use of the second LUT for converting sRGB signal values into L*a*b* values that reflect the color characteristics of the objective device 150.

Next, a process using the LUT (third LUT) for converting devRGB signal values, which reflect the color characteristics of the adjustment target device, into L*a*b* values is performed. The apparatus control unit 102 finds the L*a*b* value (second L*a*b* value) of the adjustment target device that is the closest to the first L*a*b* value, which reflects the color characteristics of the objective device, from among the L*a*b* values that are output for all the input values in the third LUT. Next, the devRGB signal value (first devRGB value) that is the input value in a case where the second L*a*b* value of the adjustment target device, which is found as the closest value, is the output value is specified from the third LUT. Then, the color adjustment LUT (fourth LUT), with which the first devRGB value is output in a case where the first RGB value (sRGB value) of the second LUT is input, is created.

These processes are repeated as many times as the number of inputs of the second LUT, which is created in S908 to convert sRGB signal values into L*a*b* values that reflect the color characteristics of the objective device. By repeating the processes, the color adjustment LUT (fourth LUT) for converting sRGB values, which are input values at the objective device, into values in the devRGB color space of the adjustment target device is created. Then, by using the color adjustment LUT (fourth LUT) in the CMS for printing, the color reproduction characteristics of the adjustment target device can be approximated to the color reproduction characteristics of the objective device.

Although the above is the explanation of the method for creating the color adjustment LUT in the present embodiment, it is possible to use any method other than the present example as long as approximation of the color reproduction characteristics of the objective device is achieved by use of RGB signal values from the color characteristic charts of the objective device and the adjustment target device. The above is the explanation of the overall flow of the color matching process in the present embodiment.

<Color Characteristic Patch Signal Value Obtainment Process of the Objective Device>

Figure 10:
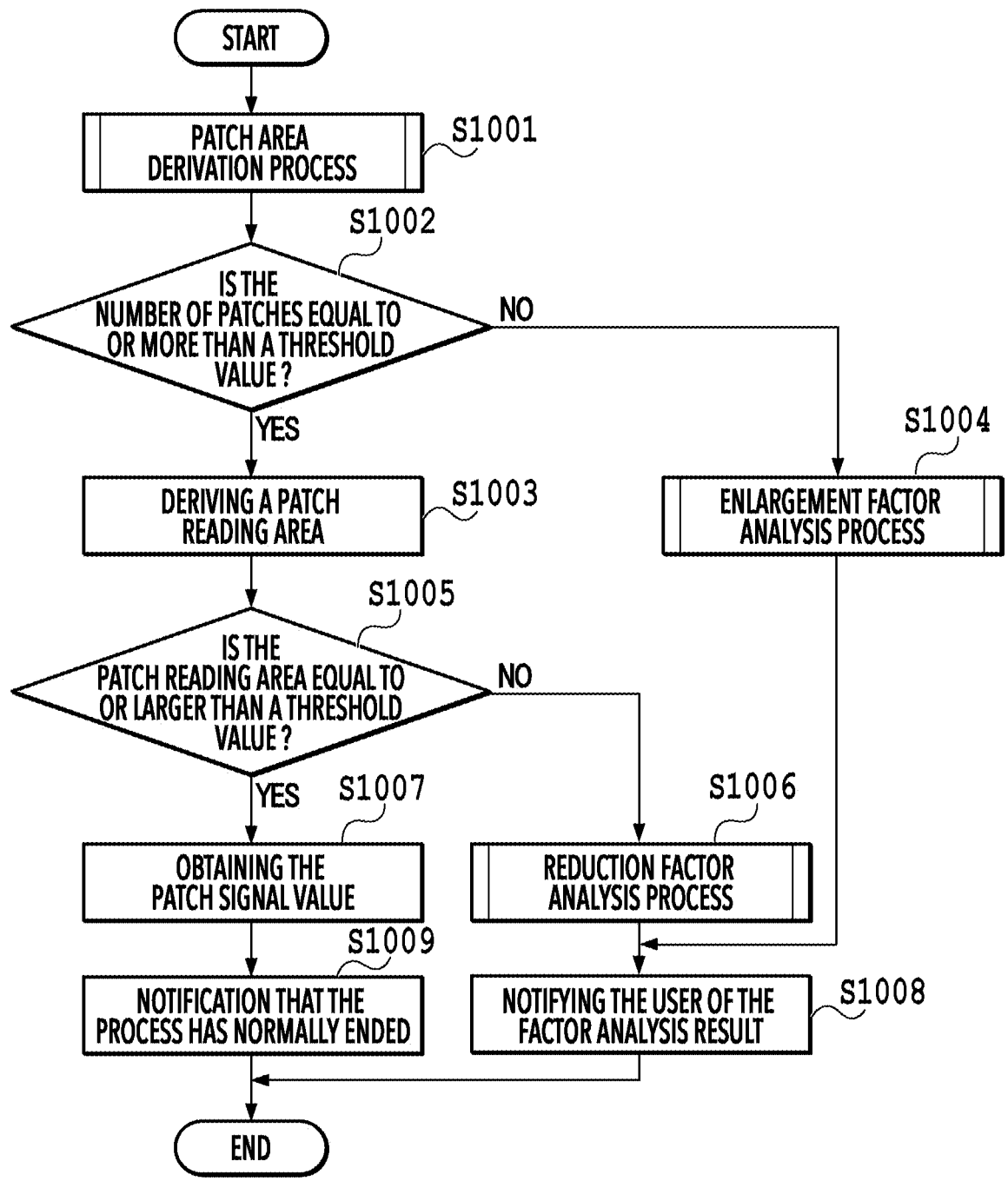
FIG. 10 is a diagram illustrating an example of a flowchart illustrating details of a patch signal value obtainment process.

FIG. 10 is a diagram illustrating an example of a flowchart illustrating details of the patch signal value obtainment process of the color characteristic chart in S902. The processes of FIG. 10 are performed by the image processing unit 103. Alternatively, it is also possible that a program code stored in the storage unit 107 is loaded into the RAM 106 and executed by the CPU 105 controlling the apparatus control unit 102. It is assumed that the data created during the processes is temporarily stored in the storage unit 107.

In S1001, the apparatus control unit 102 performs a patch area derivation process. The apparatus control unit 102 first detects the area of the color characteristic chart from the scanned image data by use of the scanned image data obtained in S901, in order to derive the enlargement ratio or reduction ratio (hereinafter referred to as the scaling ratio) of the chart. Furthermore, the patch areas are detected from the chart area, in order to derive the size and the number of patches. The detailed process contents of these are to be described later.

Next, in S1002, the apparatus control unit 102 determines whether the number of patches derived in S1001 is equal to or more than a predetermined threshold value. The predetermined threshold value of S1002 in the present embodiment is MXN, which is the number of patches in the image data of the color characteristic chart. In a case where it is determined in S1002 that the derived number of patches is equal to or more than the predetermined threshold value, the processing proceeds to S1003, and otherwise, the processing proceeds to S1004.

In S1003, the apparatus control unit 102 derives a patch readable area (hereinafter referred to as a patch reading area) from the patch size derived in S1001. The patch reading area in the present embodiment is a partial area of each area in which a patch is printed. An explanation is given of a reading area of an attention patch, which is a patch to be the processing target. The reading area of the attention patch is an area excluding the area affected by scattered light, etc., from the peripheral patches of the attention patch. For example, in the area of the attention patch, the area remaining after excluding the area of 7 mm wide that is adjacent to the peripheral patches is set as the reading area. However, the reading area is not limited to this example, and the reading area may be derived according to the characteristics of the image reading unit 108.

On the other hand, in S1004, in a case where it is determined in S1002 that the derived number of patches is less than the predetermined threshold value, the apparatus control unit 102 performs a process of analyzing enlargement factors from the number of patches derived in S1001. In a case where the number of patches is less than the given number, it is highly possible that the scanned image data obtained in S901 is obtained by scanning an enlarged color characteristic chart. Therefore, in S1004, an enlargement factor analysis process is performed. Although the details of the process of analyzing enlargement factors in S1004 are to be described later, in a case where the derived number of patches is less than the predetermined threshold value, the cause is likely to be that the color characteristic chart printed by the objective device is enlarged, so that the number of patches has become less than the number of patches that are originally desired to be obtained. The cause is analyzed from the number of patches, so as to perform a process of making it possible to provide a notification of correct print settings corresponding to the analysis result. Upon completion of the process of S1004, the processing proceeds to S1008.

In S1008, the apparatus control unit 102 performs a process of notifying the user of the factor analysis result. In the process of S1008, which is performed after S1004, the user is notified of the print settings corresponding to the analysis result of the enlargement factor analysis process of S1004. S1008 is also executed after the later-described reduction factor analysis process of S1006. In a case where S1008 is executed after S1006, the user is notified in S1008 of the print settings corresponding to the analysis result of the reduction factor analysis process of S1006.

Figure 11A:
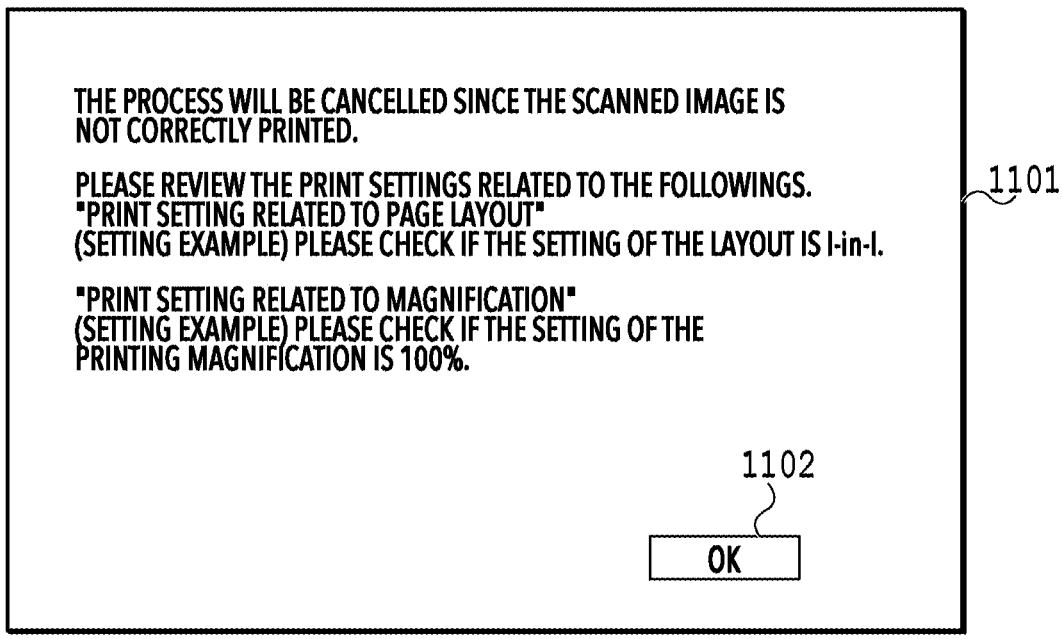
FIGS. 11A and 11B are diagrams illustrating examples of a notification method to the user.
Figure 11B:
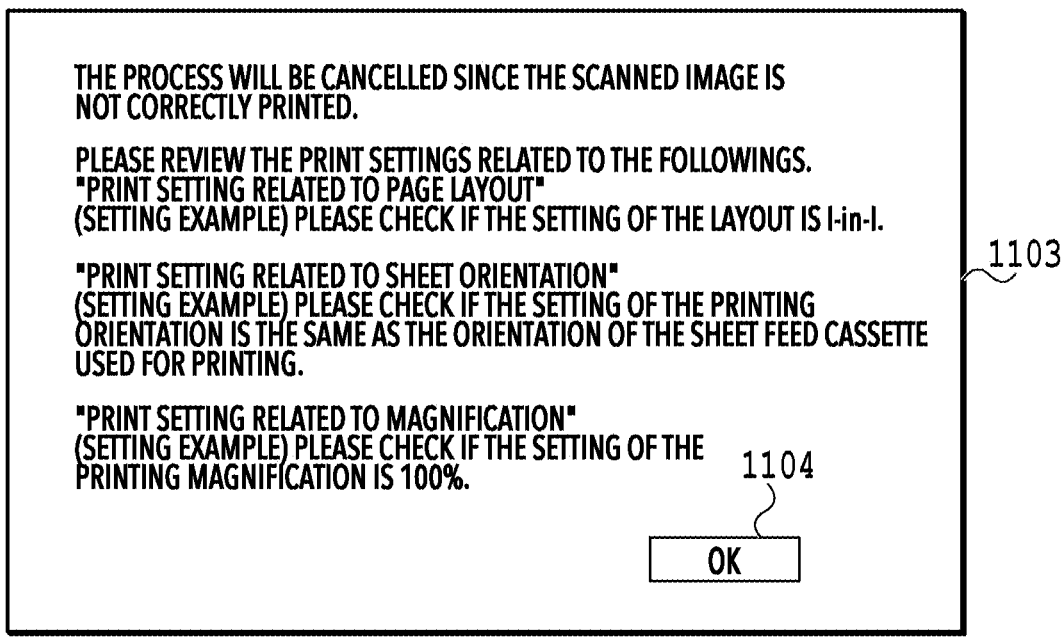

FIGS. 11A and 11B are diagrams illustrating examples of a user notification method, which is executed in S1008. As the user notification method, there are such methods of using the display 109 to display a notification on a UI as illustrated in FIGS. 11A and 11B. The UI 1101 in FIG. 11A is an example of the UI using the display 109. The UI 1101 displays a message indicating that the color matching process is to be cancelled in S911 of FIG. 9B since the color characteristic chart printed by the objective device 150 is transformed and then printed. Further, the UI 1101 displays enlargement factors, which correspond to the contents analyzed in S1004, and correct print settings. The enlargement factors displayed on the UI 1101 of FIG. 11A include an item of "PRINT SETTING RELATED TO PAGE LAYOUT". For example, it is assumed that the printing was performed with such a setting regarding the page layout (for example, poster setting) that enlarges the displayed size. In this way, since the item of "PRINT SETTING RELATED TO PAGE LAYOUT" is assumed as an enlargement factor, a message prompting the user to check that the setting of the page layout is 1-in-1 is displayed as a correct print setting. Further, in this example, it is also assumed as an enlargement factor that the setting of the printing magnification is set to 100% or more in "PRINT SETTING RELATED TO MAGNIFICATION" and, therefore, the printing in an enlarged size was performed. For this reason, the UI 1101 also displays a message prompting the user to check the setting of the printing magnification. The button 1102 is a button to be pressed by the user in a case of ending the notification display of the UI 1101.

Returning to FIG. 10, the explanation is continued below. In a case where the patch reading area is derived in S1003, the processing proceeds to S1005. In S1005, the apparatus control unit 102 determines whether the patch reading area derived in S1003 is equal to or larger than a predetermined threshold value. The area of the predetermined threshold value of S1005 in the present embodiment is an area in a size that is large enough to obtain a stable value in a case of obtaining a signal value of the patch. For example, the area of the predetermined threshold value in the present embodiment is an area of 1 mm×1 mm, but any value is possible as long as the value corresponds to a size that is large enough to obtain a stable value. In a case where it is determined in S1005 that the patch reading area is equal to or larger than the predetermined threshold value, the processing proceeds to S1007, and otherwise, the processing proceeds to S1006.

In a case where the processing has proceeded to S1007, the number of patches is equal to or more than a threshold value and the patch reading area is in a size that is large enough to obtain a stable value. That is, in that state, the patch signal values can be properly obtained by use of the scanned image data obtained in S901. Therefore, in S1007, the apparatus control unit 102 obtains the signal value of each patch from the scanned image data obtained in S901. Here, regarding the method for deriving RGB values, which are signal values of the patches, an RGB value is derived from the average value of the respective RGB values within the patch reading area of each patch area detected in S1001. Although the method of deriving the respective RGB values of the patches from the average values within the respective areas has been explained in the present embodiment, any method may be used as long as the respective RGB values of the patches can be derived. Thereafter, the processing proceeds to S1009.

In S1009, the image processing unit 103 of the apparatus control unit 102 notifies the CPU 105 that the patch signal value obtainment process of the color characteristic chart in S902 has ended normally, so that the patch signal value obtainment process ends.

In a case where it is determined in S1005 that the patch readable area is smaller than the predetermined threshold value, in S1006, the apparatus control unit 102 performs a process of analyzing reduction factors, based on the scaling ratio of the chart and the number of patches derived in S1001. Although details of the process of analyzing reduction factors in S1006 are to be described later, there is a case in which, as the factor to make the patch readable area be smaller than the predetermined threshold value, the print setting related to the page layout is set to 2-in-1, for example. Thereafter, the processing proceeds to S1008, and, as described above, the process of notifying the user of the factor analysis result is performed, and the patch signal value obtainment process ends.

FIG. 11B is a diagram illustrating an example of a notification of the result of the reduction factor analysis process. The UI 1103 in FIG. 11B is an example of the UI using the display 109. The UI 1103 displays a message indicating that the color matching process is to be cancelled in S911 in FIG. 9B since the color characteristic chart printed by the objective device is transformed and then printed. Further, the UI 1103 displays reduction factors, which correspond to the contents analyzed in S1006, and correct print settings. The reduction factors displayed on the UI 1103 of FIG. 11B include an item of "PRINT SETTING RELATED TO PAGE LAYOUT". For example, it is assumed that the printing was performed with such a setting regarding the page layout (for example, 2-in-1 setting) that reduces the displayed size. In this way, since the item of "PRINT SETTING RELATED TO PAGE LAYOUT" is assumed as a reduction factor, a message prompting the user to check that the setting of the page layout is 1-in-1 is displayed as a correct print setting. Further, in this example, "PRINT SETTING RELATED TO SHEET ORIENTATION" is also assumed as a reduction factor. In a case where the print setting related to the sheet orientation is different from the originally-desired sheet orientation, the printing is to be performed in a similar state as in a case where the setting related to the page layout is 2-in-1, and therefore the setting related to the sheet orientation is also displayed as a reduction factor for printing in a reduced size. For this reason, the UI 1103 also displays a message prompting the user to check "PRINT SETTING RELATED TO SHEET ORIENTATION", as with the page layout. Further, in this example, it is also assumed as a reduction factor that the setting of the printing magnification is set to less than 100% in "PRINT SETTING RELATED TO MAGNIFICATION" and, therefore, the printing in a reduced size was performed. For this reason, a message prompting the user to check the setting of the printing magnification is also displayed, as with the page layout. The button 1104 is a button to be pressed by the user in a case of ending the notification display of the UI 1103.

As described above, if there is a possibility that a patch cannot be properly read in a case where the color characteristic chart printed by the objective device 150 is read by the adjustment target device 100, the process is cancelled as illustrated in S911 of FIG. 9B. Here, in a case where no notification is given, the user may not know why the color matching process was cancelled or how the color matching process can be properly performed. In the present embodiment, such notifications as illustrated in FIGS. 11A and 11B allow the user to know the handling method for properly performing the color matching process. Therefore, it is possible for the user to properly perform the color matching process by printing a color characteristic chart with the objective device 150 again with proper print settings and then reading the printed color characteristic chart with the adjustment target device 100.

Figure 12:
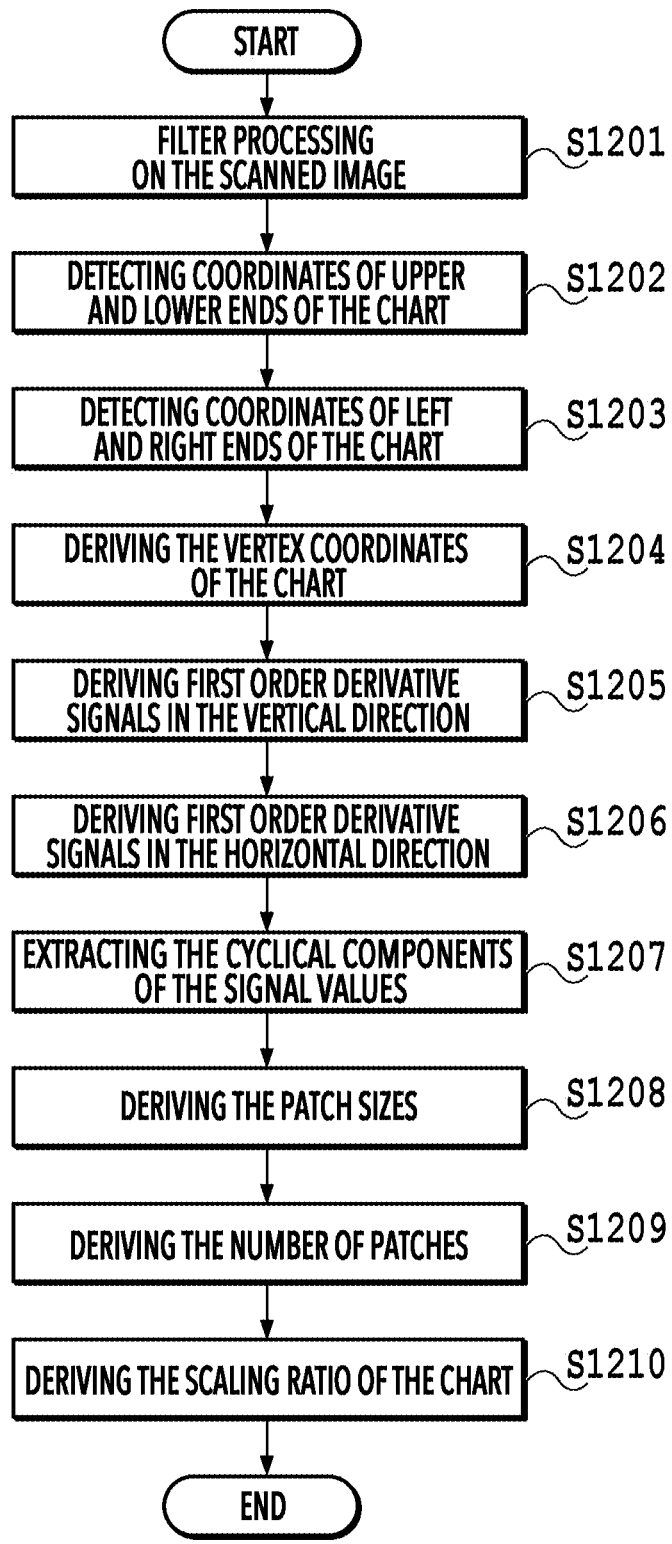
FIG. 12 is a flowchart illustrating details of a patch area derivation process.

Next, an explanation is given of details of the patch area derivation process of the color characteristic chart in S1001. FIG. 12 is a flowchart illustrating details of the patch area derivation process of the color characteristic chart in S1001 of FIG. 10. The processing according to the flowchart illustrated in FIG. 12 is performed by the image processing unit 103. Alternatively, it is also possible that a program code stored in the storage unit 107 is loaded into the RAM 106 and executed by the CPU 105 controlling the apparatus control unit 102. It is assumed that the data created during the processes is temporarily stored in the storage unit 107.

In S1201, the apparatus control unit 102 performs filter processing on scanned image data by use of the scanned image data obtained in S901. The filter processing is performed by use of such a smoothing filter that eliminates the halftone dots configured in the color characteristic chart printed by the objective device 150. By performing the filter processing, it is possible to confirm the difference in the respective RGB values of adjacent patches without being affected by the halftone dots.

In S1202, the apparatus control unit 102 detects the coordinates of the upper and lower ends of the color characteristic chart by use of the scanned image data on which the filter processing has been performed in S1201. Here, although the ends in the vertical direction of the paper surface are taken as an example for convenience of the explanation, the ends in the vertical direction of the paper surface can be replaced with an end and the other end in a predetermined direction.

Figure 13A:
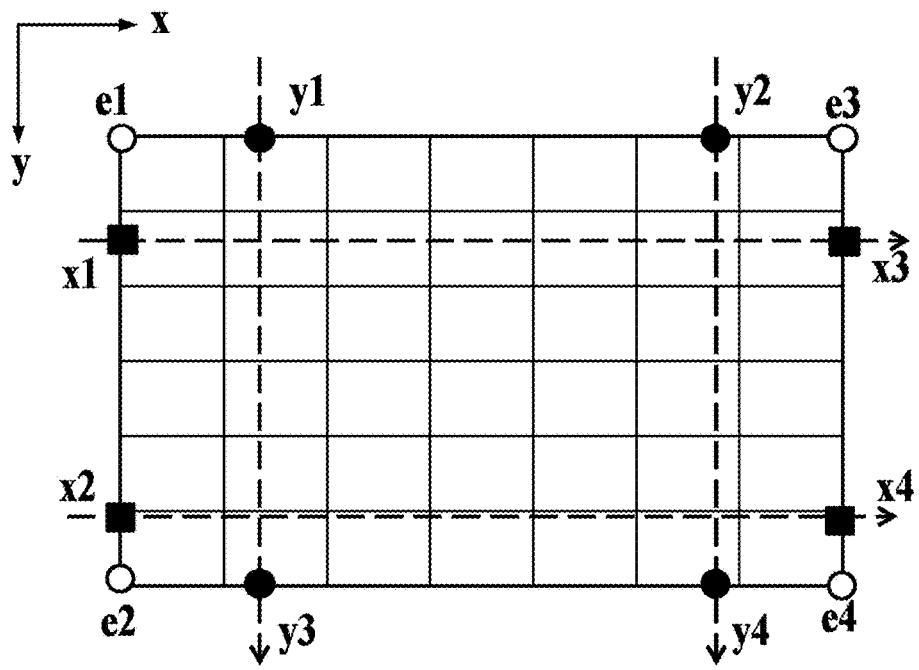
FIGS. 13A and 13B are diagrams illustrating an example of deriving end coordinates of a color characteristic chart and deriving a first order derivative signal value.

FIG. 13A is a diagram illustrating an example of detecting upper and lower end coordinates of the color characteristic chart. As with the image data of the color characteristic chart illustrated in FIG. 4, FIG. 13A has a configuration in which patches are arranged side by side. In FIG. 13A, the x-axis direction is defined as the horizontal direction and the y-axis direction is defined as the vertical direction. In S1202, the apparatus control unit 102 detects y1, y2, y3, and y4 in FIG. 13A as the coordinates of the upper and lower ends. In a case of detecting the coordinates of the upper and lower ends, there is a method of detecting an edge in the y-axis direction by deriving the difference in the respective RGB values of attention coordinates and neighboring coordinates thereof, so as to detect that the attention coordinates are coordinates of any one of the upper and lower ends in a case where the difference is equal to or greater than a predetermined value.

In S1203, the apparatus control unit 102 detects the coordinates of the left and right ends of the color characteristic chart by use of the scanned image data on which the filter processing has been performed in S1201. In S1203, the apparatus control unit 102 detects x1, x2, x3, and x4 in FIG. 13A as the coordinates of the left and right ends. In a case of detecting the coordinates of the left and right ends, there is a method of detecting an edge in the x-axis direction by deriving the difference in the respective RGB values of attention coordinates and neighboring coordinates thereof, so as to detect that the attention coordinates are coordinates of any one of the left and right ends in a case where the difference is equal to or greater than a predetermined value. In the method of deriving the coordinates of the upper and lower ends and the left and right ends in the present embodiment, although the coordinates are detected from the differences between attention coordinates and the neighboring coordinates thereof, any method is possible as long as the end coordinates can be detected.

In S1204, the apparatus control unit 102 derives the vertex coordinates of the chart area by use of the upper, lower, left, and right end coordinates derived in S1202 and S1203. In S1204, the apparatus control unit 102 detects e1, e2, e3, and e4 in FIG. 13A as the coordinates of the vertices of the chart area of the color characteristic chart. In a case of detecting the vertices of the chart area, the intersection coordinates of the straight line passing through y1 and y2 and the straight line passing through x1 and x2 are derived as e1, which correspond to vertex coordinates of the chart area. In the same method, the intersection coordinates of the straight line passing through y3 and y4 and the straight line passing through x1 and x2 are derived as e2. The intersection coordinates of the straight line passing through y1 and y2 and the straight line passing through x3 and x4 are derived as e3. The intersection coordinates of the straight line passing through y3 and y4 and the straight line passing through x3 and x4 are derived as e4.

In S1205, by use of the scanned image data to which the filter processing has been performed in S1201, the apparatus control unit 102 extracts signal values in the y-axis direction, which is the vertical direction in the chart area, and derives first order derivative signal values from the extracted signals.

Figure 13B:
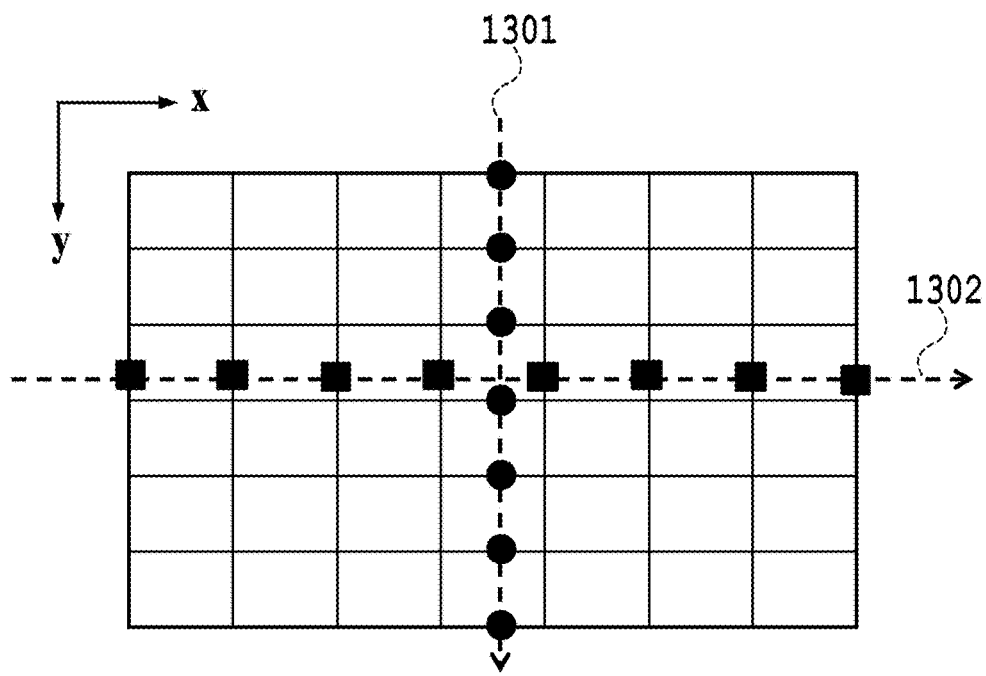

FIG. 13B is a diagram illustrating an example of deriving first order derivative signal values in the present embodiment. FIG. 13B has the same configuration as the image data of the color characteristic chart of FIG. 4. The x-axis direction is defined as the horizontal direction and the y-axis direction is defined as the vertical direction. The first order derivative signal values derived in S1205 are signal values derived by finding first order derivatives of the extracted signals from top to bottom with respect to the y-direction, as indicated by the arrow 1301 in FIG. 13B. As a result, since the amount of change in first order derivative signal values increases near the edge of each patch, it is possible to detect the edge coordinates of each patch.

Next, in S1206, by use of the scanned image data to which the filter processing has been performed in S1201, the apparatus control unit 102 extracts signal values in the x-axis direction, which is the horizontal direction in the chart area, and derives first order derivative signal values from the extracted signals. The first order derivative signal values derived in S1206 are signal values derived by finding first order derivatives of the extracted signals from left to right with respect to the x-direction, as indicated by the arrow 1302 in FIG. 13B. Since the amount of change in first order derivative signal values increases near the edge of each patch, it is possible to detect the edge coordinates of each patch.

In S1207, the apparatus control unit 102 extracts the cyclical components of signal values by use of the first order derivative signal values derived in S1205 and S1206. The extraction of the cyclical components of the signal values in the present embodiment is performed by performing an autocorrelation analysis on the first order derivative signal values derived in S1205 and S1206 so as to derive autocorrelation signal data. Specifically, the cyclical components of the signal values are derived by use of the autocorrelation function $R_x$ illustrated in Expression (1).

$$R_x(\tau) = \frac{1}{N} \sum \{x(i) - \bar{x}\}\{x(i+\tau) - \bar{x}\} \quad \text{Expression (1)}$$

Here, x is first order derivative signal data, N is the number of data sets of first order derivative signal data, and $\tau$ is a shift amount. Further, by use of the derived autocorrelation function $R_x$, the autocorrelation coefficient data $\varphi_x$ is derived, as illustrated in Expression (2).

$$\phi_x(\tau) = \frac{R_x(\tau)}{R_x(0)} \quad \text{Expression (2)}$$

By the autocorrelation analysis, it is possible to confirm the consistency of the signal x with the signal shifted by the shift amount $\tau$ of the signal x. Further, in the autocorrelation coefficient data, τ with a large correlation coefficient value indicates the periodicity of the signals. That is, by extracting shift amounts τ with large correlation coefficients from the autocorrelation coefficient data $\varphi_x$, it is possible to extract the cyclical components including the patch size. Here, such a shift amount τ that is the local maximum value, which exceeds a predetermined threshold value, is extracted from the autocorrelation coefficient data $\varphi_x$. In a case where $R_x(0)$ is 0, autocorrelation coefficient data cannot be derived, and therefore the autocorrelation coefficient data $\varphi_x$ is 0. Furthermore, the predetermined threshold value in the present embodiment is set to 0.3, at which it can be determined that there is a statistical correlation.

In S1208, the apparatus control unit 102 derives the patch sizes in the x-axis direction and the y-axis direction by use of the cyclical components of the signal values extracted in S1207. As for the derivation of a patch size in the present embodiment, a patch size is determined by the cyclical component of the signal values extracted in S1207 whose integer multiple value is included in the cyclical components. Since the autocorrelation coefficient data that is a cyclical component increases with each integer multiple of the patch size, the patch size is determined by the cyclical component whose integer multiple value is included in the cyclical components.

In S1209, the apparatus control unit 102 derives the number of patches by using the patch sizes in the x-axis direction and the y-axis direction, which are derived in S1208, and the vertex coordinates of the chart, which are derived in S1204. First, the dimensions of the chart area are derived from the vertex coordinates of the chart area. Next, the dimensions of a patch are derived from the patch sizes in the x-axis direction and the y-axis direction. By dividing the dimensions of the chart area by the dimensions of the patch area, the number of patches in the chart area can be derived.

In S1210, the apparatus control unit 102 derives the scaling ratio of the scanned color characteristic chart by use of the patch sizes in the x-axis direction and the y-axis direction, which are derived in S1208. For example, the scaling ratio of the color characteristic chart is derived by a change in the proportion of the dimensions of a patch area, which is derived from the patch sizes in the x-axis direction and the y-axis direction derived in S1208, to the dimensions of the area of the color characteristic chart scanned in such a setting that the color characteristic chart is not transformed at all. In the present embodiment, it is assumed that the dimensions of the area of the color characteristic chart scanned in such a setting that the color characteristic chart is not transformed at all are prepared in advance in the storage unit 107.

The above is the explanation of the flow of the patch area derivation process of the color characteristic chart in S1001 of the present embodiment. By the above processes, the patch size, the number of patches, and the scaling ratio of the color characteristic chart in the scanned image data obtained in S901 are derived. The method is not limited to the example explained above, and any method can be used as long as the chart area of the color characteristic chart can be derived, and the patch size, the number of patches, and the scaling ratio of the color characteristic chart can be derived.

Figure 14:
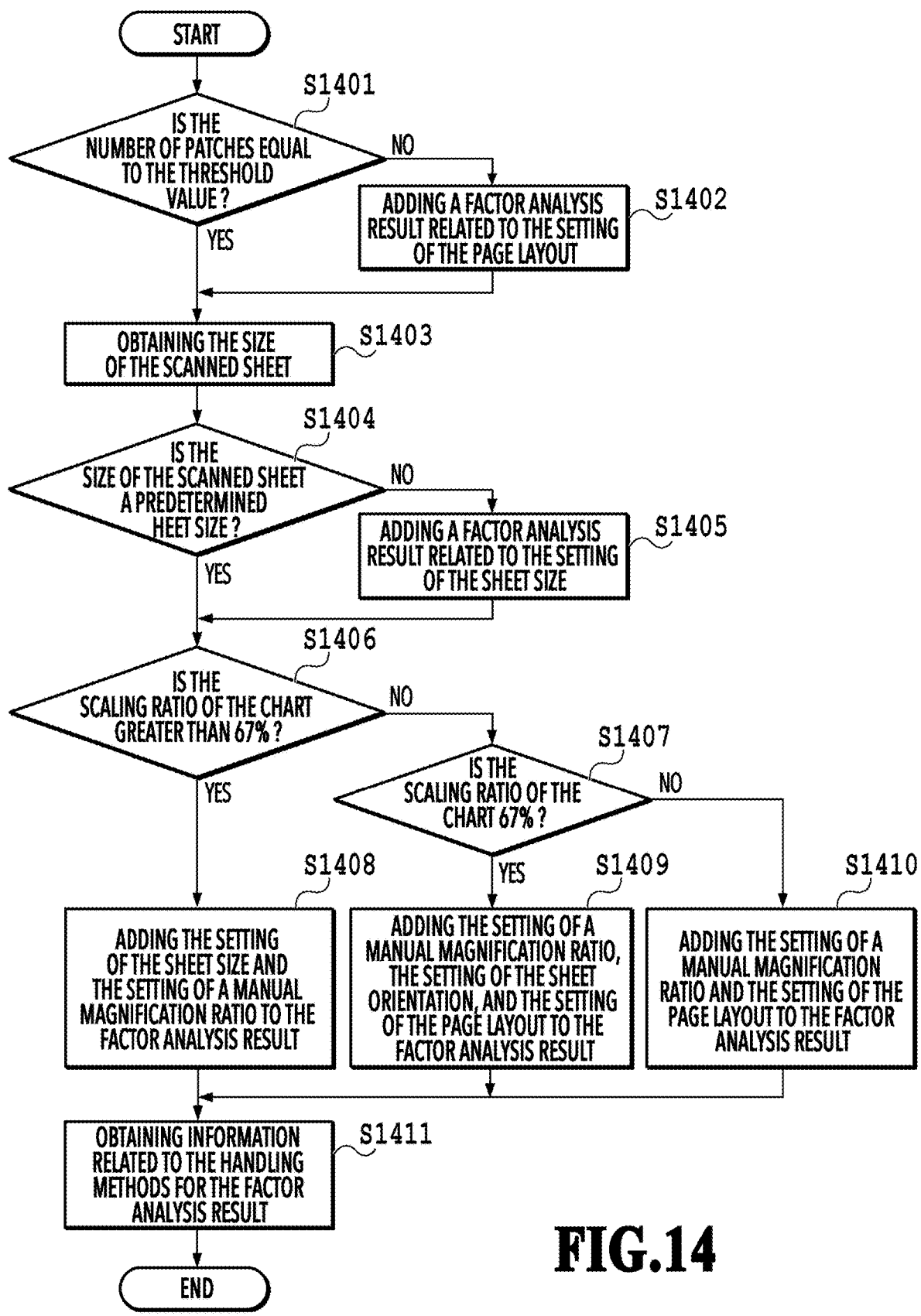
FIG. 14 is a flowchart illustrating details of a process of analyzing reduction factors.

Next, an explanation is give of details of the process of analyzing reduction factors of the color characteristic chart in S1006. FIG. 14 is a flowchart illustrating details of the process of analyzing reduction factors of the color characteristic chart in S1006. As for the reduction factors, it is possible that multiple events correspond to one factor. In the processing of FIG. 14, a determination is made for each event, so that, in a case where an event is matched, the corresponding factor is added as a reduction factor. For the processes in the flowchart illustrated in FIG. 14, a program code stored in the storage unit 107 is loaded into the RAM 106 and executed by the CPU 105 controlling the apparatus control unit 102. It is assumed that the data created during the processes is temporarily stored in the storage unit 107.

In S1401, the apparatus control unit 102 determines whether the number of patches in the scanned chart, which is derived in S1209, is equal to a predetermined threshold value regarding the number of patches. This threshold value is the same value as the threshold value used for the determination in S1002 of FIG. 10. That is, in a case where the processing has proceeded to the reduction factor analysis process (S1006 in FIG. 10) explained with reference to FIG. 14, it is determined in S1002 that the number of patches is equal to or more than the threshold value. In that state, in S1401, whether the number of patches is equal to the threshold value is determined.

As described above, this threshold value is M×N, which is the number of patches in the image data of the color characteristic chart. That is, in a case where the number of patches is equal to the number of patches that should be originally included (should be detected), it is considered that the size is not reduced, and therefore the processing proceeds to S1403. On the other hand, in a case where the number of patches is not equal to that number of patches, that is, in a case where the derived number of patches is more than the number of patches that should be originally included, the processing proceeds to S1402. In a case where the number of patches in the scanned chart is not equal to the threshold value (that is, in this example, in a case where the number of patches is more than the threshold value) in S1401, the apparatus control unit 102 determines in S1402 that the print setting related to the page layout is a reduction factor, so that the factor is added to the analysis result. Thereafter, the processing proceeds to S1403.

The setting of the page layout in the present embodiment is a setting such as 2-in-1. If there are multiple color characteristic charts, in a case of the 2-in-1 setting, multiple color characteristic charts are printed in one scanned image, so that the derived number of patched becomes more than the original number of patches in a color characteristic chart. Therefore, in a case where the number of patches in the scanned chart is not equal to the original number of patches of the color characteristic chart, the setting related to the page layout is considered as a reduction factor.

On the other hand, in a case where the number of patches in the scanned chart is equal to the threshold value in S1401, the processing proceeds to S1403. In S1403, the apparatus control unit 102 obtains the sheet size of the color characteristic chart scanned by the image reading unit 108.

In S1404, the apparatus control unit 102 determines whether the size of the scanned sheet, which is obtained in S1403, is a predetermined sheet size. In a case where it is determined in S1404 that the size of the scanned sheet is not the predetermined sheet size, the processing proceeds to S1405, and, otherwise, the processing proceeds to S1406. For example, the predetermined sheet size can be a sheet size in which the color characteristic chart is not transformed. In a case where a common color characteristic chart is used for the objective device 150 and the adjustment target device 100, the adjustment target device 100 holds information about the sheet size in which the color characteristic chart should be printed. Therefore, the determination in S1404 is made by comparing the sheet size of the read color characteristic chart with the held information. Alternatively, it is also possible that the adjustment target device 100 obtains information about the sheet size in which the color characteristic chart should be printed by the objective device 150 by another method. In a case where the size of the scanned sheet is not the predetermined sheet size, the printing was performed with such a setting that does not correspond to the sheet sizes in which the color characteristic chart should not be transformed, so that the sheet size is reduced according to the setting. In a case where the printing is performed in the sheet size reduced according to the setting, the patch reading area becomes smaller than the patch reading area in the determination of S1005. Therefore, in S1405, the apparatus control unit 102 determines that the setting related to the sheet size is a reduction factor, and the setting related to the sheet size is added as a reduction factor. Thereafter, the processing proceeds to S1406.

In S1406, the apparatus control unit 102 determines whether the scaling ratio (enlargement/reduction ratio) of the color characteristic chart derived in S1210 is greater than a predetermined value (for example, 67%). In a case where it is determined in S1406 that the scaling ratio of the chart is greater than 67%, the processing proceeds to S1408, and, otherwise, the processing proceeds to S1407. In a case of the 2-in-1 setting or in a case of a setting that causes for a different sheet orientation, the scaling ratio becomes 67% or less. Therefore, in S1406, whether the scaling ratio is greater than 67% is determined.

In S1408, the apparatus control unit 102 adds the setting of the sheet size and the setting of a manual magnification ratio to the analysis result of reduction factors. It is also possible that reduction factors have already been set in the processing so far. For example, the setting of the sheet size may have already been set in S1405. The present process is to find a reduction factor from a different viewpoint (that is, the scaling ratio of the color characteristic chart), compared to S1405. In a case where the setting related to the page layout is 2-in-1, the scaling ratio of the color characteristic chart is 67% or less. Therefore, in a case where the scaling ratio of the color characteristic chart is greater than 67%, the setting related to the page layout is excluded from reduction factors. Further, in a case where the setting related to the sheet orientation is different from the originally-desired sheet orientation, printing is performed in a similar state as in a case where the setting related to the page layout is 2-in-1. Therefore, in S1408, the setting related to the sheet orientation is also excluded from reduction factors. In a case where such a print setting of a sheet size in which the scaling ratio is greater than 67% is provided and in a case where a print setting related to a manual magnification ratio is provided, there is a possibility that the printing is performed in such a state where the patch reading area is smaller than the patch reading area in the determination of S1005. Therefore, in S1408, the print setting of the sheet size and the print setting related to a manual magnification ratio are added to the analysis result of reduction factors. Thereafter, the processing proceeds to S1411.

On the other hand, in a case where it is determined in S1406 that the scaling ratio of the color characteristic chart is not greater than 67%, that is, in a case where the scaling ratio of the color characteristic chart is determined to be 67% or less, the processing proceeds to S1407. In S1407, the apparatus control unit 102 determines whether the scaling ratio of the color characteristic chart is 67%. In a case where it is determined in S1408 that the scaling ratio of the color characteristic chart is 67%, the processing proceeds to S1409, and, otherwise, the processing proceeds to S1410.

In S1409, the apparatus control unit 102 adds the setting of a manual magnification ratio, the setting related to the sheet orientation, and the setting related to the page layout to the analysis result of reduction factors. In a case where the setting related to the sheet orientation is different from the originally-desired sheet orientation, printing is performed in a similar state as in a case where the setting related to the page layout is 2-in-1, in which the scaling ratio of the color characteristic chart is 67%. Therefore, in S1409, the setting related to the page layout and the setting related to the sheet orientation are added as reduction factors. In addition, since the setting of a manual magnification ratio can be considered as a reduction factor, the setting of a manual magnification ratio is also added to reduction factors. Thereafter, the processing proceeds to S1411.

In a case where it is determined in S1407 that the scaling ratio of the color characteristic chart is not 67%, that is, in a case where the scaling ratio of the color characteristic chart is less than 67%, the processing proceeds to S1410. In S1410, the apparatus control unit 102 adds the setting of a manual magnification ratio and the setting related to the page layout to the analysis result of reduction factors. In a case where the scaling ratio of the color characteristic chart is less than 67%, it is considered that a reduction factor is that the imposition number is more than 2-in-1 (for example, 4-in-1) according to the setting related to the page layout. Therefore, the setting related to the page layout and the setting of a manual magnification ratio are added to the analysis result of reduction factors. Thereafter, the processing proceeds to S1411.

In S1411, by use of the analysis result of the reduction factors added so far, the apparatus control unit 102 obtains information related to print settings that should be reviewed for each factor. For example, in a case where the setting related to the page layout is a reduction factor, the handling method is to set the print setting of the layout to 1-in-1. Similarly, in a case where the setting related to the sheet size is a reduction factor, the handling method is to set the sheet size to a predetermined size (for example, A4 or LTR) or to "ACTUAL SIZE". Similarly, in a case where the setting related to the sheet orientation is a reduction factor, the handling method is to set the sheet orientation to a direction corresponding to the larger number of M and N in a case of the color characteristic chart of M×N. Similarly, in a case where the setting related to a manual magnification ratio is a reduction factor, the handling method is to set the scaling ratio to 100%. It is assumed that the information about these handling methods is stored in advance in the storage unit 107, for example. The above is the explanation of the process of analyzing reduction factors of the color characteristic chart in S1006 of the present embodiment. The user is to be notified of the factors obtained by the analysis as the causes for reduction.

Figure 15:
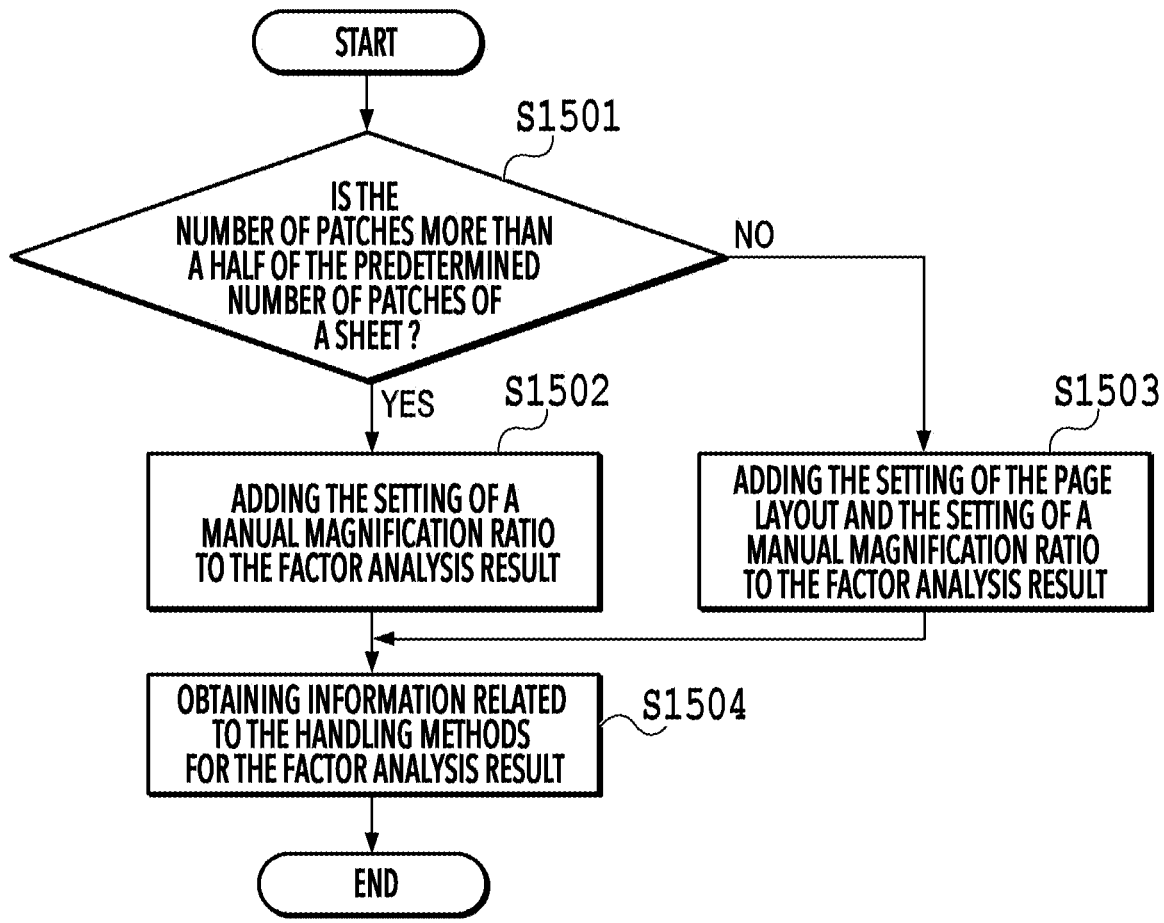
FIG. 15 is a flowchart illustrating details of a process of analyzing enlargement factors.

FIG. 15 is a flowchart illustrating details of the process of analyzing enlargement factors of the color characteristic chart in S1004. For the processes in the flowchart illustrated in FIG. 15, a program code stored in the storage unit 107 is loaded into the RAM 106 and executed by the CPU 105 controlling the apparatus control unit 102. It is assumed that the data created during the processes is temporarily stored in the storage unit 107.

In S1501, the apparatus control unit 102 determines whether the number of patches in the scanned color characteristic chart, which is derived in S1209, is more than a half of the original number of patches in the color characteristic chart. In a case where it is determined in S1501 that the number of patches in the scanned color characteristic chart is more than a half of the original number of patches in the color characteristic chart, the processing proceeds to S1502, and, otherwise, the processing proceeds to S1503.

In S1502, the apparatus control unit 102 adds the setting related to a manual magnification ratio to the analysis result of enlargement factors. As a result of a setting related to a manual magnification ratio, for example, there is a case in which an end of the color characteristic chart area that should be printed is not printed. That is, it is assumed that the enlargement factor is that the color characteristic chart area that should be printed is not entirely printed, so that the number of patches has become less than the original number of patches in the color characteristic chart. Therefore, the setting related to a manual magnification ratio is added as an enlargement factor. Thereafter, the processing proceeds to S1504.

On the other hand, in a case where the number of patches in the color characteristic chart is not more than a half of the original number of patches in the color characteristic chart, the processing proceeds to S1503. That is, in a case where it is determined that the number of patches in the color characteristic chart is equal to or less than a half of the original number of patches in the color characteristic chart, the apparatus control unit 102 adds the setting of the page layout and the setting of a manual magnification ratio to the analysis result of enlargement factors in S1503. For example, there may be such a case in which a print setting for printing a poster is set as the setting related to the page layout. In this case, one color characteristic chart is segmented into multiple areas and then printed. Since the chart area is segmented into multiple areas, the number of patches becomes equal to or less than a half of the original number of patches in the color characteristic chart. Therefore, the setting related to the page layout is added to enlargement factors in addition to the setting related to a manual magnification ratio. Thereafter, the processing proceeds to S1504.

In S1504, by use of the analysis result of the enlargement factors added so far, the apparatus control unit 102 obtains information related to print settings that should be reviewed for each factor. In a case where the setting related to the page layout is an enlargement factor, the handling method is to set the print setting of the layout to 1-in-1, that is, to check that the print setting of the layout is not a poster setting. Similarly, in a case where the setting related to a manual magnification ratio is an enlargement factor, the handling method is to set the scaling ratio to 100%. The above is an explanation of the flow of the process of analyzing enlargement factors of the color characteristic chart in S1004. The user is to be notified of the factors obtained by the analysis as the causes for enlargement.

<Color Characteristic Patch Signal Value Obtainment Process of the Adjustment Target Device>

Figure 16:
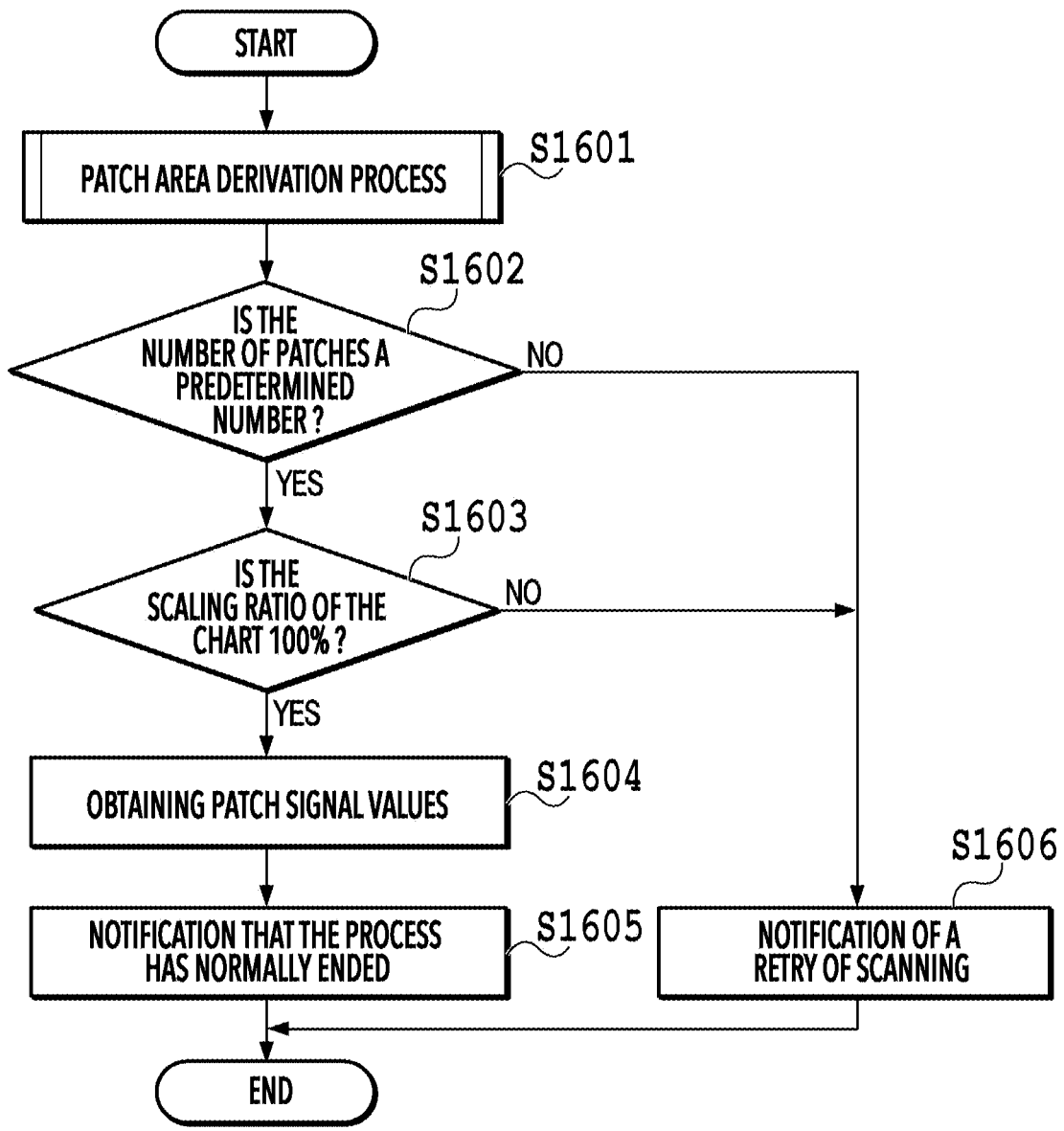
FIG. 16 is a flowchart illustrating a process of obtaining the RGB values of each patch of the adjustment target device.

FIG. 16 is a flowchart illustrating details of the process of obtaining the RGB values of the respective patches in the color characteristic chart by use of the scanned image data of the color characteristic chart printed by the adjustment target device 100 in S906. The processing according to the flowchart illustrated in FIG. 16 is performed by the image processing unit 103. Alternatively, it is also possible that a program code stored in the storage unit 107 is loaded into the RAM 106 and executed by the CPU 105 controlling the apparatus control unit 102. It is assumed that the data created during the processes is temporarily stored in the storage unit 107.

In S1601, by use of the scanned image data of the adjustment target device 100, which is obtained in S905, the apparatus control unit 102 detects the area of the color characteristic chart in the scanned image data and derives the scaling ratio of the chart, the patch size, and the number of patches. The process of S1601 in the present embodiment is the same as that of S1001, and, therefore, the explanation thereof is omitted.

Next, in S1602, the apparatus control unit 102 determines whether the number of patches derived in S1601 is equal to a predetermined threshold value. The predetermined threshold value in S1602 of the present embodiment is MXN, which is the number of patches in the color characteristic chart. In a case where it is determined that the derived number of patches is equal to the predetermined threshold value, the processing proceeds to S1603, and otherwise, the processing proceeds to S1606.

In a case where it is determined in S1602 that the derived number of patches is not equal to the predetermined threshold value, the apparatus control unit 102 determines in S1606 that the patch area derivation process of the color characteristic chart in S1601 has not normally ended. Then, a notification of a retry of scanning of the color characteristic chart printed by the adjustment target device 100 is provided. As described above, in the present example, in the case of the color characteristic chart printed in S904, a print setting that causes the chart to be transformed is not performed. Therefore, it is assumed that the originally-desired color characteristic chart has not been scanned. Therefore, the process of notifying the user of a retry of scanning of the color characteristic chart of the adjustment target device 100 is performed.

In a case where it is determined in S1602 that the derived number of patches is equal to the predetermined threshold value, the apparatus control unit 102 determines in S1603 whether the scaling ratio of the color characteristic chart in S1601 is 100%. In a case where the scaling ratio is 100%, the processing proceeds to S1604, and, otherwise, the processing proceeds to S1606.

In a case where it is determined in S1603 that the scaling ratio of the color characteristic chart is not 100%, the apparatus control unit 102 determines in S1606 that the patch area derivation process of the color characteristic chart in S1601 has not normally ended. Then, a notification of a retry of scanning of the color characteristic chart printed by the adjustment target device 100 is provided. As described above, in the present example, in the case of the color characteristic chart printed in S904, a print setting that causes the chart to be transformed is not performed. Therefore, in a case where the scaling ratio is not 100%, it is assumed that the originally-desired color characteristic chart has not been scanned. Therefore, the process of notifying the user of a retry of scanning of the color characteristic chart of the adjustment target device 100 is performed.

In a case where it is determined in S1603 that the scaling ratio of the color characteristic chart is 100%, in S1604, the apparatus control unit 102 obtains the signal value of each patch of the adjustment target device from the scanned image data obtained in S905.

Next, in S1605, the image processing unit 103 of the apparatus control unit 102 notifies the CPU 105 that the patch signal value obtainment process of the color characteristic chart in S1601 has normally ended, so that the patch signal value obtainment process of the adjustment target device ends. The above is the explanation of the processing for obtaining the RGB value of each patch in the color characteristic chart of the adjustment target device in S906 of the present embodiment.

As explained above, according to the processing of the present embodiment, the color matching process can be realized by use of a scanner mounted on an image processing apparatus. Therefore, in the color matching process, it is not necessary to use a color measurement device that measures color values of a printed color characteristic chart. Accordingly, it is possible to eliminate a step of operating a color measurement device and a step of moving a printed color characteristic chart, so that it is possible to simplify the steps for the user to perform the color matching process. Further, without preparing a special sheet having an opening or the like, it is possible for the user to print the color characteristic chart in a state of the objective device that the user currently uses. Moreover, since the color matching process is performed by use of the color characteristics represented by the objective device as desired by the user, the color characteristics printed by the adjustment target device by use of the color adjustment LUT created in the color matching process are to be as desired by the user.

Furthermore, according to the processing of the present embodiment, in a case where the user prints a transformed chart with the objective device 150 without noticing that the chart is transformed, the color matching process is cancelled. According to the present embodiment, in the case where the color matching process is cancelled because the user printed the transformed chart with the objective device 150 without noticing that the chart is transformed, it is possible to notify the user of the reason for the cancellation of the color matching process and the handling method as well. Therefore, it is possible for the user to confirm the cause for the cancellation of the color matching process and take appropriate measures.

In the present embodiment, the explanation has been given of the example in which the web server 140 is connected to the PC 130 via the network 101. However, it is also possible that the adjustment target device 100 includes the same configuration as the web server 140, and it is also possible that the PC 130 obtains a color characteristic chart from the adjustment target device 100. In this case, in a case where the PC 130 communicates with the adjustment target device 100 via the network 101, the PC 130 displays a web browser as illustrated in FIG. 3. Alternatively, any method may be used as long as a color characteristic chart that is held in advance in the adjustment target device 100 can be obtained by use of the PC 130. Furthermore, although the PC 130 is used to print the color characteristic chart with the objective device 150 in the present embodiment, it is also possible to use an information apparatus, such as a smartphone, to obtain a color characteristic chart and to provide a print instruction to the objective device 150.

Second Embodiment

In the first embodiment, the explanation has been given of the example in which a color characteristic chart printed by the objective device 150 is scanned by the adjustment target device 100 and then a color characteristic chart is printed and scanned by the adjustment target device 100. In the present embodiment, an explanation is given of the example in which the color characteristic chart printed by the objective device 150 and the color characteristic chart printed by the adjustment target device 100 are scanned at once. Hereinafter, the parts different from the first embodiment are mainly explained.

Figure 17:
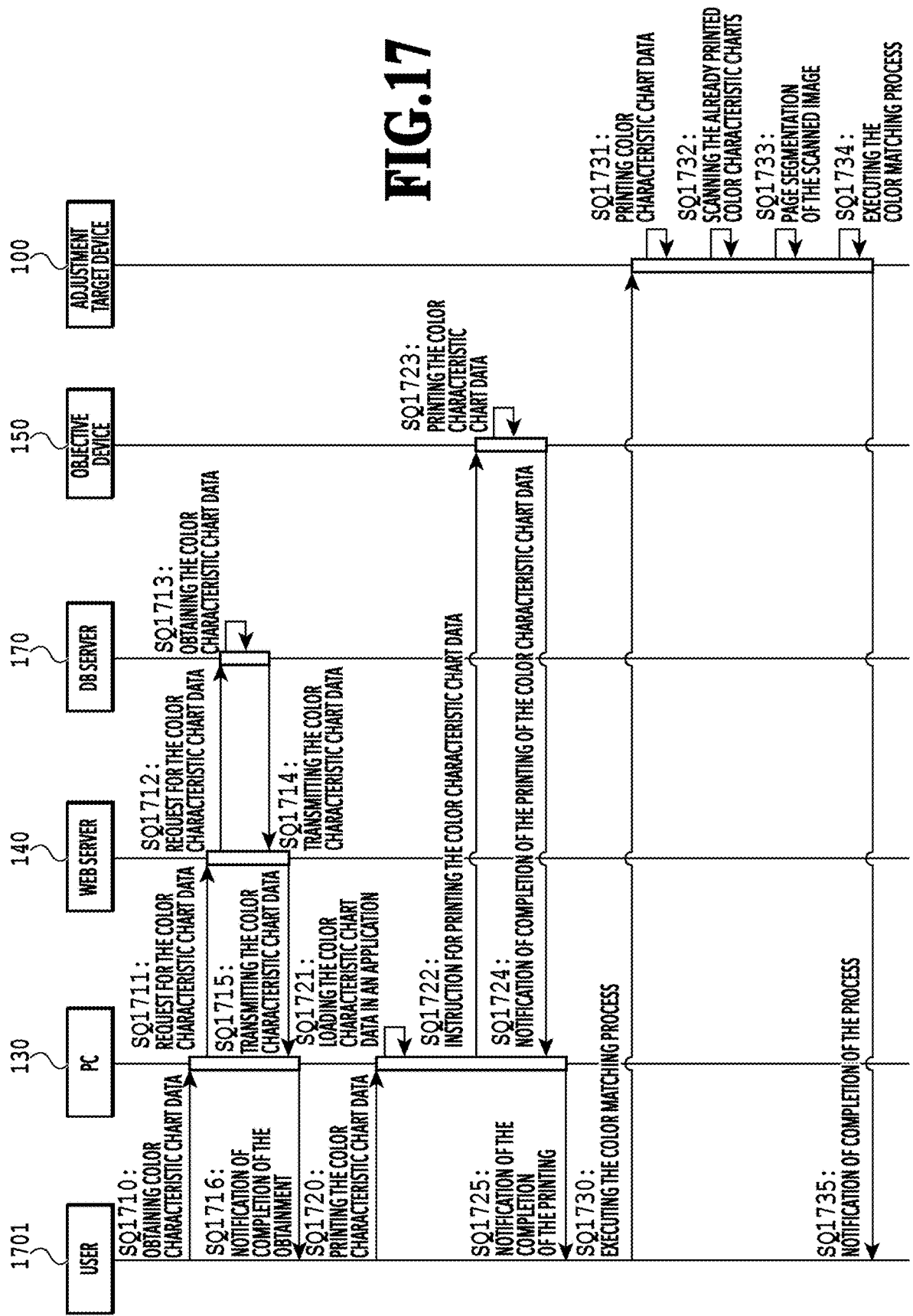
FIG. 17 is a diagram illustrating an overall sequence of a color matching process.

FIG. 17 is a diagram illustrating the overall sequence of the color matching process in the present embodiment. Since the flow from SQ1710 to SQ1730 is the same as the flow from SQ210 to SQ230 of the first embodiment, the explanation thereof is omitted. Further, since SQ1731 is the same as SQ232 of the first embodiment, the explanation thereof is omitted.

Next, in SQ1732, by use of the image reading unit 108, the adjustment target device 100 scans the color characteristic chart printed by the objective device 150 in SQ1723 and the color characteristic chart printed by the adjustment target device 100 in SQ1731. Specifically, the user 1701 sets each of the color characteristic charts on the ADF such that the color characteristic chart printed by the adjustment target device 100 is placed on the color characteristic chart printed by the objective device 150, for example. Then, the adjustment target device 100 starts scanning and saves the color characteristic charts as image data of multiple pages.

Figure 18:
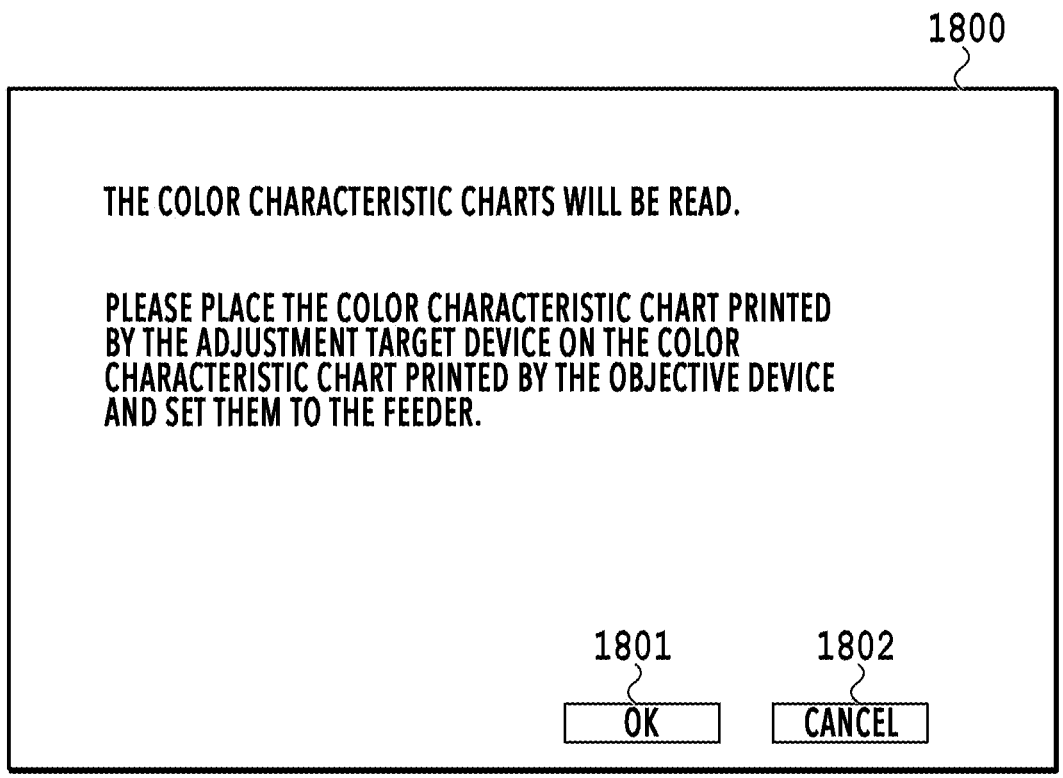
FIG. 18 is a diagram illustrating an example of a UI displayed on the adjustment target device.

In FIG. 18, an example of the UI to be displayed on the display 109 of the adjustment target device 100 in a case where the printed color characteristic charts are scanned at once is illustrated. The UI 1800 is a UI for instructing the user 1701 to perform scanning in a case where the color characteristic charts are scanned at once. That is, the UI is displayed on the adjustment target device 100 after the process of SQ1731. The UI 1800 includes a sentence explaining how to place the color characteristic charts in a case of scanning the printed color characteristic charts at once. Although the UI in the present example includes the explanation with texts only, it is also possible that the UI includes an explanation with illustrations. In a case where the button 1801 is pressed, the adjustment target device 100 instructs the image reading unit 108 to execute the scan process. It is also possible that the adjustment target device 100 is configured not to control the image reading unit 108 to execute the scan process in a case where the user presses the button 1801 in a state where the color characteristic charts are not placed on the ADF. The button 1802 is a button to be pressed by the user in a case of cancelling the scan process. In a case where the button 1802 is pressed by the user, the adjustment target device 100 cancels the execution of the color matching process, so that the screen transitions to the initial window, which is the UI 500 in FIG. 5.

Next, in SQ1733, the adjustment target device 100 performs page segmentation on the image data of multiple pages scanned in SQ1732. That is, the adjustment target device 100 performs page segmentation, so that the read image data is segmented into the image data of the color characteristic chart printed by the objective device 150 and the image data of the color characteristic chart printed by the adjustment target device 100.

In a case where each color characteristic chart to be printed is one page and the scanning is performed in such a state where the color characteristic chart printed by the adjustment target device 100 is placed on the color characteristic chart printed by the objective device 150, the page segmentation method is as described below. In a case where multiple pages are read by an ADF, the original document placed on top is read first. Therefore, the original document on the first page is the color characteristic chart printed by the adjustment target device 100, and the original document on the second page is the color characteristic chart printed by the objective device 150. Therefore, the adjustment target device 100 allocates the scanned image of the first page to the image data of the adjustment target device 100 and the scanned image of the second page to the image data of the objective device 150. In this way, pages can be allocated to the image data of the adjustment target device 100 and the image data of the objective device 150 in the order of reading the pages according to the number of pages of the color characteristic charts to be printed.

An explanation is given of another method. Since the color conversion process by the CMS is not performed on the color characteristic chart printed by the adjustment target device 100 as described above, it is possible for the adjustment target device 100 to have information regarding a change in patch signals in advance. Therefore, it is also possible that an image of which the scanned signal values are within the range of the change in the patch signal values of the color characteristic chart printed by the adjustment target device 100 is allocated as the scanned image of the adjustment target device 100.

Further, an explanation is given of another method. There may be such a configuration in which a mark, which is not illustrated in the drawings, is included in the color characteristic chart printed by the adjustment target device 100. Then, the device that printed a scanned image can be determined based on the presence/absence of the mark. Any method may be used as long as it is possible to perform page segmentation on images that are scanned at once according to a characteristic.

Since SQ1734 and SQ1735 are the same as SQ234 and SQ235 of the first embodiment, the explanations thereof are omitted.

Figure 19B:
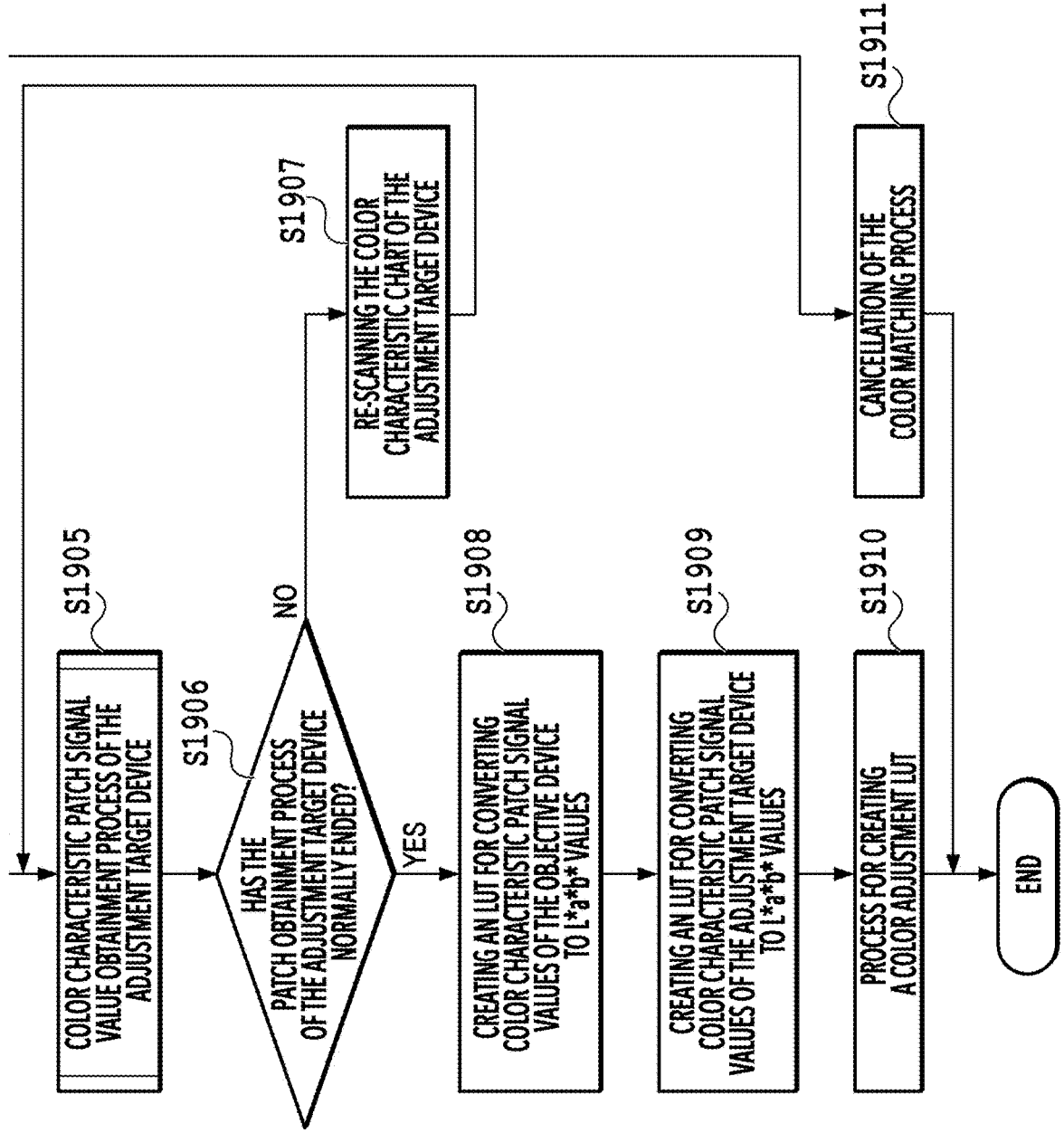

FIGS. 19A and 19B are totally a flowchart illustrating the color matching process performed by the adjustment target device 100 in the present embodiment. First, in S1901, the apparatus control unit 102 performs printing of the preliminarily-held color characteristic chart data by use of the image output unit 110 of the adjustment target device 100. Since S1901 is the same as S904 of the first embodiment, the explanation thereof is omitted.

Next, in S1902, by use of the ADF of the image reading unit 108, the apparatus control unit 102 scans the color characteristic chart printed by the objective device 150 and the color characteristic chart printed by the adjustment target device 100 in S1901. Then, the scanned image data of the multiple scanned pages is obtained.

Next, in S1912, the apparatus control unit 102 performs page segmentation on the scanned image data, which is scanned in S1902, and allocates the respective pages to the image data of the adjustment target device 100 and the image data of the objective device 150. Since the page segmentation method is the same as that in SQ1733, the explanation thereof is omitted.

Next, in S1913, the apparatus control unit 102 determines whether the segmentation has been correctly performed in the process of page segmentation in S1912, and, in a case where it is determined that the page segmentation has been correctly performed, the apparatus control unit 102 performs the process of S1903. In a case where it is determined in S1913 that the page segmentation cannot be performed, in S1914, the apparatus control unit 102 re-scans the color characteristic chart printed by the objective device 150 and the color characteristic chart printed by the adjustment target device 100 in S1901. The scanning method and the like are the same as those in S1902. It is assumed that the case in which the page segmentation cannot be performed correctly is a case in which only one sheet was scanned or a case in which the segmentation method in SQ1733 is not applicable (for example, in a case of performing page segmentation based on a mark, the mark cannot be detected).

Since S1903 and S1904 as well as S1905 and S1906 are the same as S902 and S903 as well as S906 and S907 of the first embodiment, respectively, the explanations thereof are omitted.

In a case where it is determined in S1906 that the patch signal processing of the adjustment target device 100 has not normally ended, in S1907, the apparatus control unit 102 re-scans the color characteristic chart printed by use of the adjustment target device 100. In S1901, the color characteristic chart printed by use of the objective device 150 and the color characteristic chart printed by use of the adjustment target device 100 are scanned at once. However, in S1907, only the color characteristic chart printed by the adjustment target device 100 is scanned. Since the UI in S1907 is the same as the UI 620 of FIG. 6C in the first embodiment, the explanation thereof is omitted.

Since the subsequent steps S1908 to S1911 are the same as S908 to S911 of the first embodiment, the explanations thereof are omitted.

As explained above, according to the present embodiment, the operability for the user can be improved by scanning the color characteristic chart printed by the objective device 150 and the color characteristic chart printed by the adjustment target device at once.

Third Embodiment

In the first embodiment, the explanation has been given of the example in which the PC 130 causes the objective device 150 to print a color characteristic chart by use of image data of a color characteristic chart obtained from the web server 140. In the present embodiment, an explanation is given of the example in which the PC 130 reads image data of a color characteristic chart saved in a storage medium, such as a USB memory, so that the objective device 150 performs printing of the read image data. Although the storage medium in the present embodiment is a USB memory, any storage medium such as an SD card, a CD, or a DVD can be used as long as the storage medium can be connected to a PC or the like, so as to receive and transmit saved data. Hereinafter, the parts different from the first embodiment are explained.

Figure 20:
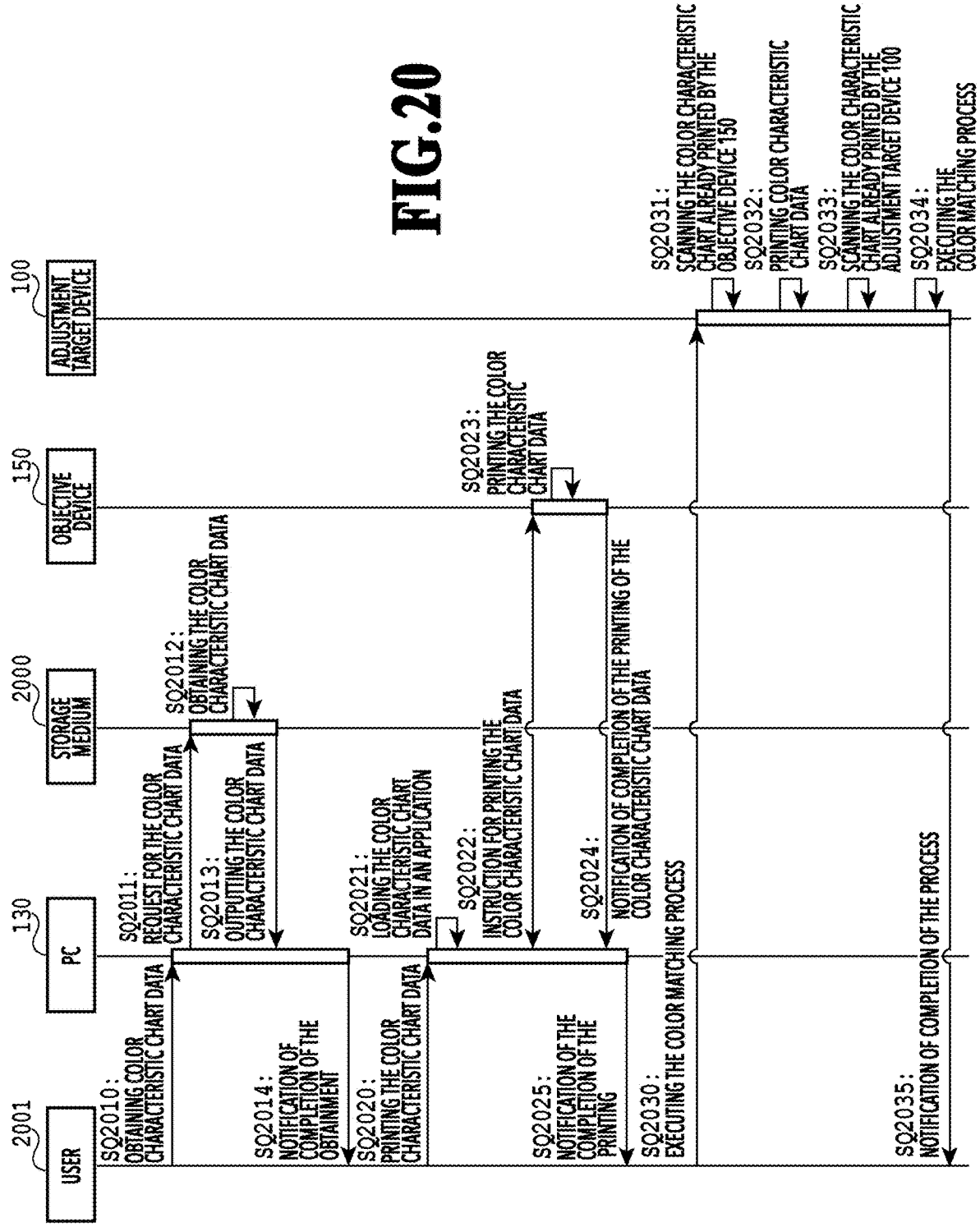
FIG. 20 is a diagram illustrating an overall sequence of a color matching process.

FIG. 20 is a diagram illustrating the overall sequence of the color matching process in the present embodiment. First, in SQ2010, the PC 130 is operated by the user to obtain a color characteristic chart that is saved in advance in the storage medium 2000. In response to this operation, in SQ2011, the PC 130 requests the storage medium 2000 for image data of the corresponding color characteristic chart. Next, in SQ2012, the storage medium 2000 obtains the file corresponding to the image data of the color characteristic chart requested in SQ2011. Next, in SQ2013, the storage medium 2000 outputs the color characteristic chart data obtained in SQ2012 to the PC 130.

Next, in SQ2014, upon completion of the obtainment of the image data of the color characteristic chart in SQ2013, the PC 130 notifies the user 2001 that the obtainment is completed.

Since the subsequent steps SQ2020 to SQ2035 are the same as SQ220 to SQ235 of the first embodiment, the explanations thereof are omitted.

As explained above, according to the present embodiment, it is possible to perform the color matching process even in a case where the image data of the color characteristic chart saved in a storage medium is read by a PC. Therefore, it is possible to perform the color matching process even in a case where the PC 130 is not connected to a web server.

Although it is assumed that the interface that can be connected to the storage medium 2000, which is an external device in the present embodiment, utilizes a USB (Universal Serial Bus) connection, it is also possible to use any other interfaces that can be connected to an external device.

Fourth Embodiment

In the first embodiment, the explanation has been given with the example of a print environment in which print data is transmitted from the PC 130 to an image processing apparatus. In the present embodiment, an explanation is given of the example in which, in the print environment where the user uses an image processing apparatus, printing is directly executed from a storage medium connected to the image processing apparatus.

Figure 21:
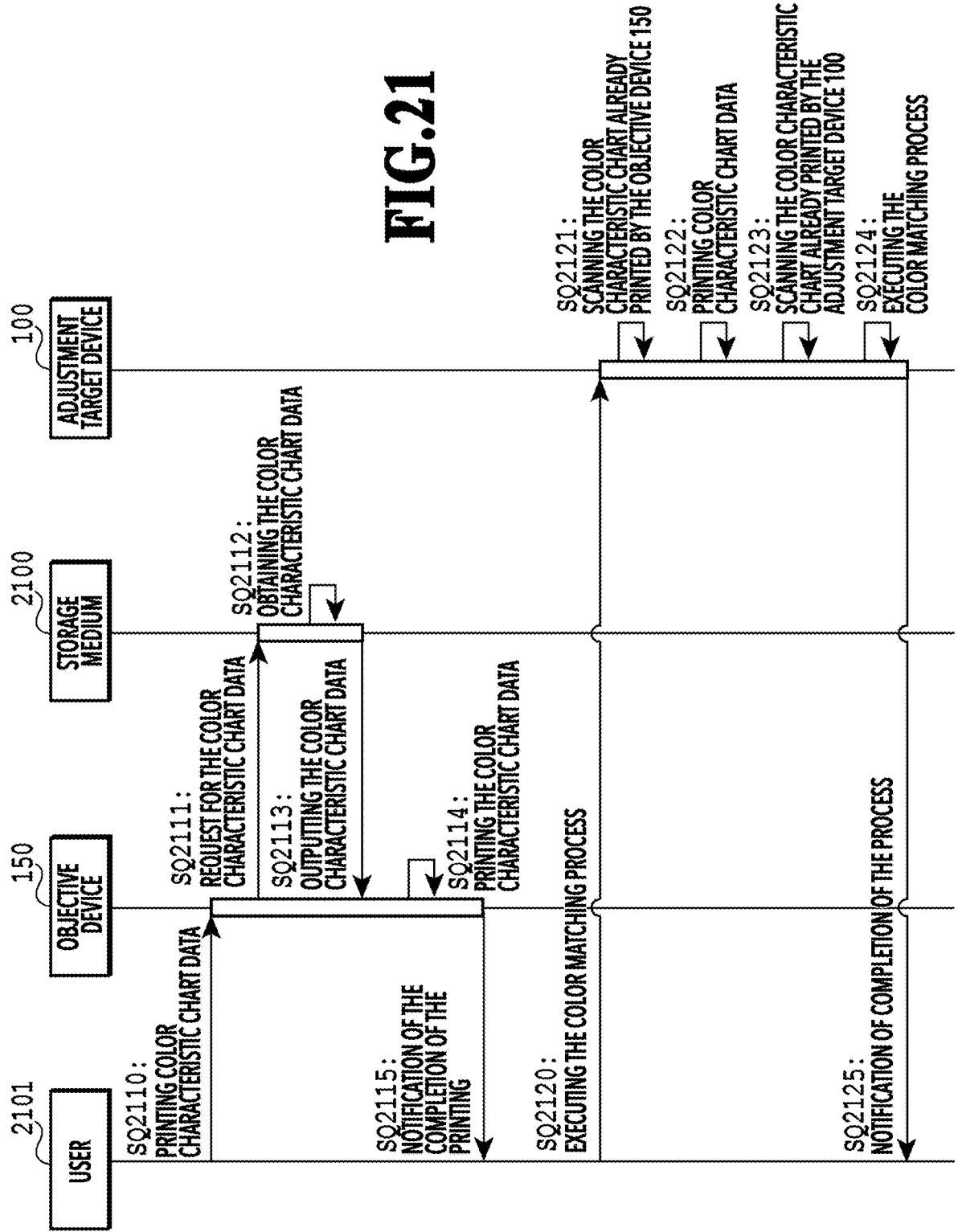
FIG. 21 is a diagram illustrating an overall sequence of a color matching process.

FIG. 21 is a diagram illustrating the overall sequence of the color matching process in the present embodiment. First, in SQ2110, the objective device 150 is operated by the user to print a color characteristic chart that is saved in advance in the storage medium 2100. Then, in SQ2111, the objective device 150 requests the storage medium 2100 for image data of the corresponding color characteristic chart.

The explanation is continued with reference to FIG. 5 again. In the present embodiment, FIG. 5 is a diagram illustrating an example of the UI for the user 2101 to instruct the objective device 150 to print the image data of the color characteristic chart by use of the storage medium 2100. In the present embodiment, the timing of executing the printing of the image data by use of the storage medium 2100 is in a case where the button 505 is pressed by the user 2101. The button 505 is a button for providing an instruction for execution of direct print. Direct print is a printing method for directly printing image data stored in a storage medium. It is also possible that each function is displayed in a list structure, instead of the button format.

Figure 22:
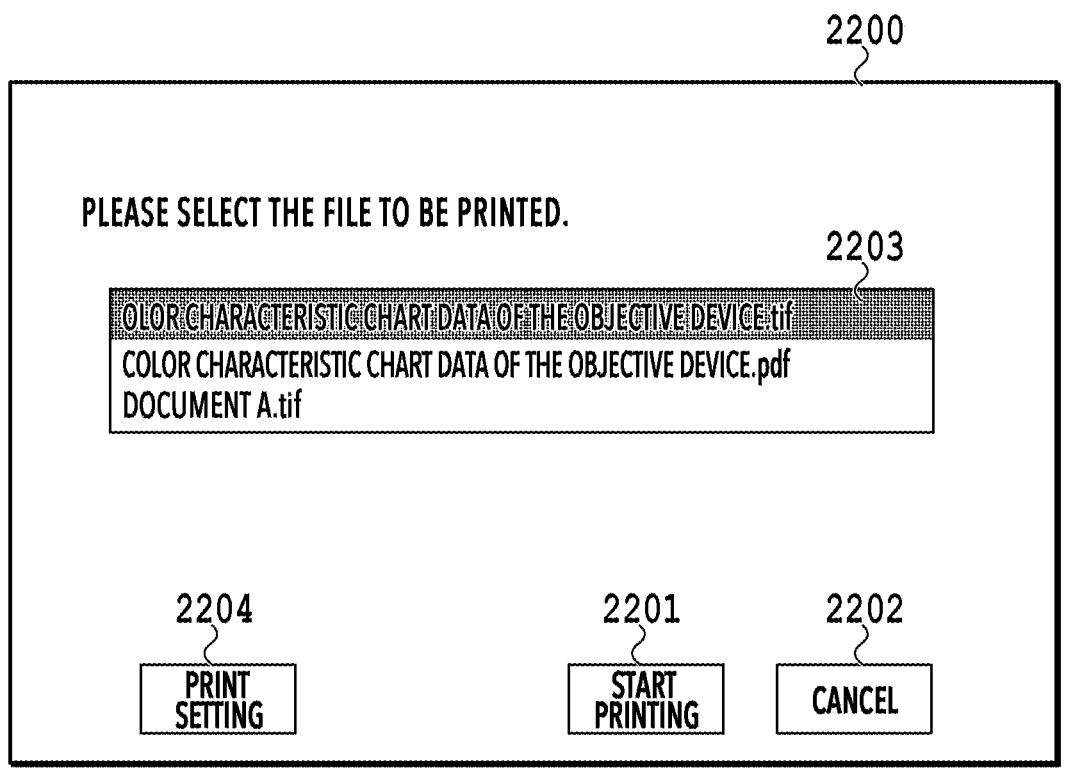
FIG. 22 is a diagram illustrating an example of a UI displayed on the objective device.

FIG. 22 is a diagram illustrating an example of the UI 2200 displayed on the objective device 150 in a case where the button 505 is pressed by the user 2101. In a case where the button 505 is pressed, the objective device 150 displays the UI 2200, which is for selecting an image file to be printed from the connected storage medium 2100. In the list box 2203 of the UI 2200, printable image files and the like stored in the connected storage medium 2100 are displayed. The image file to be printed is changed according to the selected image file. It is assumed that the item selected as the image file to be printed in the present embodiment is illustrated with a gray background color (hatching). The button 2204 is a button to be pressed by the user 2101 for performing print settings, such as the printing sheet, the color mode, and the density adjustment, for printing an image file. In a case where the user presses the button 2204, the screen jumps to a UI (not illustrated) for performing print settings.

The button 2201 is a button to be pressed by the user 2101 in a case where selection of the image file to be printed is finished. In a case where the user 2101 presses the button 2201, the display of the UI 2200 ends and printing is started according to the print settings set by the user. The button 2202 is a button to be pressed by the user 2101 in a case of cancelling the selection of the image file to be printed. In a case where the button 2202 is pressed by the user, the display of the UI 2200 ends, and the screen jumps to the UI 500.

Returning to FIG. 21, the explanation of the sequence diagram continues. Next, in SQ2112, the storage medium 2100 obtains, from the storage area of itself, the file corresponding to the image data of the color characteristic chart requested in SQ2111. Next, in SQ2113, the storage medium 2100 outputs the color characteristic chart data obtained in SQ2112 to the objective device 150.

Next, in SQ2114, the objective device 150 performs a color conversion process on the image data of the color characteristic chart obtained in SQ2113 according to the print settings used by the user, and the objective device 150 performs printing by use of the image output unit 160. Next, upon completion of the printing of the image data of the color characteristic chart, in SQ2115, the objective device 150 notifies the user 2101 of completion of the printing.

Since the subsequent steps SQ2120 to SQ2125 are the same as SQ230 to SQ235 of the first embodiment, the explanations thereof are omitted.

As explained above, in the present embodiment, the color matching process can be performed even in a case where image data is directly obtained from a storage medium for printing in the print environment where the user uses an image processing apparatus.

Fifth Embodiment

In the first embodiment, the explanation has been given of the example in which a color characteristic chart is printed by the adjustment target device after a color characteristic chart is printed by the objective device, and each of the color characteristic charts is scanned. In the present embodiment, in a case of performing the color matching process, a registration process including printing and scanning of a color characteristic chart is firstly executed by the adjustment target device. Thereafter, a creation process for creating a color adjustment LUT by use of the registered data and a color characteristic chart printed by the objective device is performed in the example to be explained. Hereinafter, the parts different from the first embodiment are mainly explained.

Figure 23:
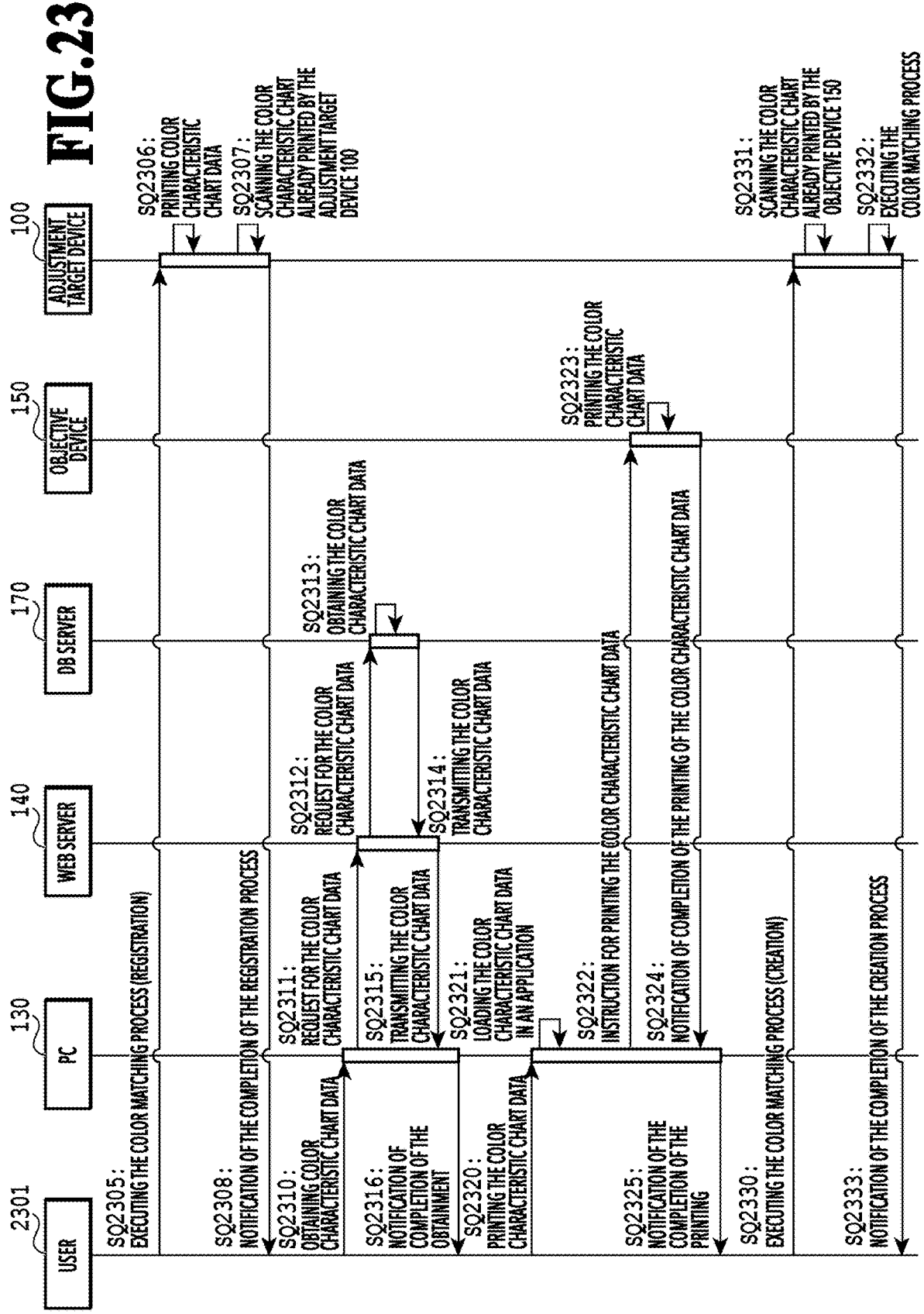
FIG. 23 is a diagram illustrating an overall sequence of a color matching process.

FIG. 23 is a diagram illustrating the overall sequence of the color matching process in the present embodiment. First, in SQ2305, the adjustment target device 100 is operated by the user 2301 to execute the registration process in the color matching process. The registration process in the color matching process in the present embodiment is a process including a process of printing a color characteristic chart by the adjustment target device 100 and a process of scanning the color characteristic chart printed by the adjustment target device 100.

Figure 24:
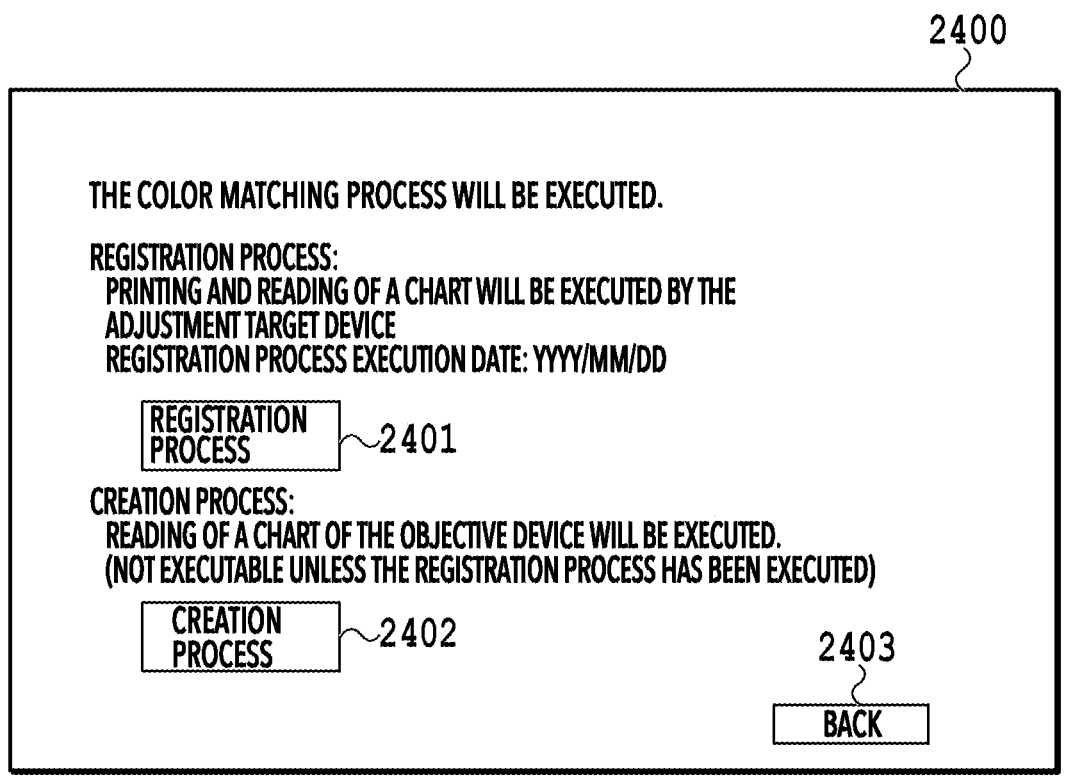
FIG. 24 is a diagram illustrating an example of a UI displayed on the adjustment target device.

FIG. 24 is a diagram illustrating an example of the UI 2400 displayed on the adjustment target device 100 in a case where the color matching process is executed in the present embodiment. The UI 2400 includes the button 2401 for executing the registration process and the button 2402 for executing the creation process. In a case where the button 2401 is pressed by the user 2301, the adjustment target device 100 executes the registration process in the color matching process. Although the date on which the registration process is performed is displayed in the present embodiment, it is also possible that information such as the sheet for printing the color characteristic chart is displayed.

On the other hand, in a case where the button 2402 is pressed by the user 2301, the adjustment target device 100 executes the creation process in the color matching process. The creation process in the color matching process of the present embodiment is a process including a process of scanning the color characteristic chart printed by the objective device 150 and a process of creating a color adjustment LUT. There may be such a configuration in which pressing of the button 2402 is enabled in a status where the registration process of the color matching process is previously executed.

Returning to FIG. 23, the explanation thereof is continued. Next, in SQ2306, the adjustment target device 100 executes printing with the image output unit 110 by use of image data of a color characteristic chart internally stored in advance. Since the details of the process in SQ2306 is the same as those of SQ232 in the first embodiment, the explanations thereof are omitted.

Next, in SQ2307, by use of the image reading unit 108, the adjustment target device 100 scans the color characteristic chart printed by the adjustment target device 100 in SQ2306. Since the details of the process in SQ2307 is the same as those of SQ233 in the first embodiment, the explanations thereof are omitted.

Next, upon receiving a notification of the completion of the scanning of the color characteristic chart in SQ2307, the adjustment target device 100 notifies the user 2301 of the completion of the registration process in the color matching process by use of the display 109 in SQ2308.

Since the flow from SQ2310 to SQ2325 is the same as that from SQ210 to SQ225 of the first embodiment, the explanation thereof is omitted.

Next, in SQ2330, the adjustment target device 100 is operated by the user 2301 to execute the creation process in the color matching process. Next, in SQ2331, by use of the image reading unit 108, the adjustment target device 100 scans the color characteristic chart printed by the objective device 150 in SQ2323. Since the details of the process in SQ2331 is the same as those of SQ231 in the first embodiment, the explanations thereof are omitted.

Next, in SQ2332, the adjustment target device 100 executes the color matching process by use of the color characteristic chart scanned in SQ2307 and the color characteristic chart scanned in SQ2331. Since the details of the process in SQ2332 is the same as those of SQ234 in the first embodiment, the explanations thereof are omitted.

Next, upon receiving a notification of the completion of the color matching process in SQ2332, the adjustment target device 100 notifies the user 2301 of the completion of the color matching process by use of the display 109 in SQ2333.

The above is the overall flow up to the point where the adjustment target device performs the color matching process. Next, the flow of the registration process and the flow of the creation process performed in the adjustment target device 100 are explained. Since the processes are basically the same as the respective processes explained in the first embodiment, the explanations are given by use of the flowchart of FIGS. 9A and 9B.

The registration process is started from the process of S904 and ends in a case where the determination made in the process of S907 is "YES". Next, the flow of the creation process is explained. In the creation process, the processes of S901 to S903 are performed, and, in a case of "YES" in S903, the processes of S908 to S910 are performed. In a case of "NO" in S903, the process of S911 is performed.

As explained above, according to the present embodiment, it is possible to scan the color characteristic chart printed by the objective device and the color characteristic chart printed by the adjustment target device at respective timings.

Sixth Embodiment

In the first embodiment, an explanation is also given of the example in which the cause for cancellation of the color matching process and the handling method thereof are displayed on the display 109 of the adjustment target device 100 so that the user is notified. In the present embodiment, an explanation is given of the example of changing the notification method for notifying the cause for cancellation of the color matching process and the handling method thereof. Hereinafter, the parts different from the first embodiment are mainly explained.

Figure 25:
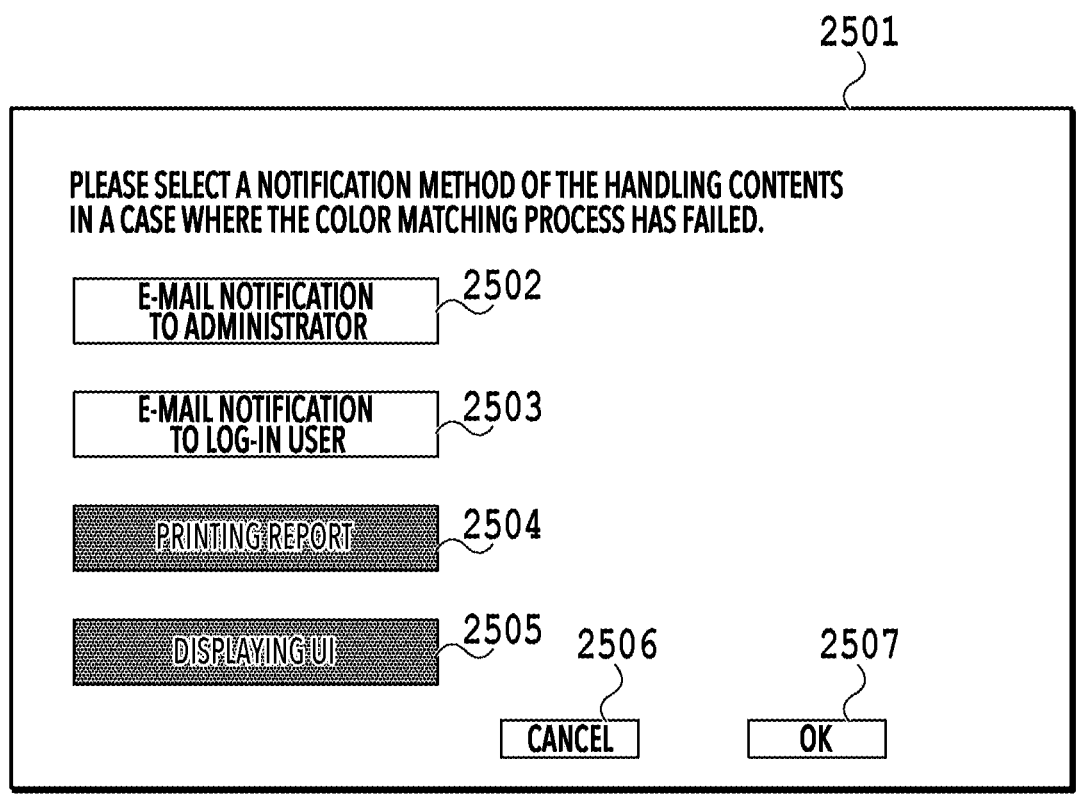
FIG. 25 is a diagram illustrating an example of a UI for setting a notification method for a notification to the user.

FIG. 25 is a diagram illustrating an example of the UI for setting a notification method for notifying the user of the cause for cancellation of the color matching process and the handling method thereof in S1008. The UI 2501 in FIG. 25 is an example of the UI by use of the display 109. In the UI 2501, a message for instructing the user to select a notification method is displayed. The UI 2501 is a UI which is controlled to be displayed in a case where the user changes the setting of the notification method for notifying the cause for cancellation of the color matching process and the notification method thereof.

The button 2502 of FIG. 25 is a button to be pressed for a setting in which the user provides a notification of the cause for cancellation of the color matching process and the handling method thereof to an e-mail address that is registered in advance as an administrator of the adjustment target device 100. The button is configured such that the displayed background color thereof is inverted in a case where the notification method by use of an e-mail to an administrator is set, so that the setting of the e-mail transmission is recognizable for the user.

The button 2503 of FIG. 25 is a button to be pressed for a setting in which the user provides a notification of the cause for cancellation of the color matching process and the handling method thereof to an e-mail address corresponding to a log-in user who has logged in to the adjustment target device 100. The button is configured such that the displayed background color thereof is inverted in a case where the notification method by use of an e-mail to a user who has logged in is set, so that the setting of the e-mail transmission is recognizable for the user.

The button 2504 of FIG. 25 is a button to be pressed for a setting in which a report of the cause for cancellation of the color matching process and the handling method thereof is printed by use of the image output unit 110 as a notification to the user. The button is configured such that the displayed background color thereof is inverted in a case where the notification method of printing a report is set, so that the setting of printing a report is recognizable for the user.

The button 2505 of FIG. 25 is a button to be pressed for a setting in which the cause for cancellation of the color matching process and the handling method thereof are displayed on a UI by use of the display 109 as a notification to the user. The button is configured such that the displayed background color thereof is inverted in a case where the display of the UI is set, so that the setting is recognizable for the user.

Although multiple settings (simultaneous settings) of the button 2502, the button 2503, the button 2504, and the button 2505 are possible in the present embodiment, it is also possible that only the setting corresponding to the button that is lastly pressed by the user is valid. Furthermore, in the present embodiment, it is assumed that the UI 2501 in FIG. 25 is set for the initial window, in which the notification methods of the report printing of the button 2504 and the UI display of the button 2505 are initially set.

The button 2506 in FIG. 25 is a button to be pressed by the user in a case of cancelling the setting for changing the notification method on the UI 2501. In a case where the button 2506 in FIG. 25 is pressed, the status before the user selects notification methods is maintained and the display of the UI 2501 ends.

The button 2507 in FIG. 25 is a button to be pressed by the user in a case of reflecting the setting for changing the notification method on the UI 2501, so that the set notification methods are held. In a case where the button 2507 in FIG. 25 is pressed, the settings of the button 2502, the button 2503, the button 2504, and the button 2505 are maintained, and the display of the UI 2501 ends.

The example illustrated in FIG. 25 is merely an example, and other notification methods may be used. For example, it is also possible that a predetermined audio message is output, so that the user is notified of the cause for cancellation of the color matching process and the handling method thereof. Furthermore, it is also possible to provide a notification of the cause for cancellation of the color matching process and the handling method thereof to another information processing terminal that is connected to the adjustment target device 100. These notification methods may be further added to the UI of FIG. 25. Furthermore, although the UI 2501 of FIG. 25 is displayed on the display 109 of the adjustment target device 100 in the explained example, it is also possible that the UI 2501 is displayed on a screen of another information processing terminal that is connected to the adjustment target device 100.

As explained above, according to the present embodiment, it is possible to change the notification method for notifying the user of the cause for cancellation of the color matching process and the handling method thereof.

Other Embodiments

As for the method for deriving the patch size in a scanned color characteristic chart, although the example of performing detection by use of the periodicity based on the autocorrelation analysis has been explained in the above-described embodiment, any method may be used as long as the patch size can be derived. For example, there may be a method in which an edge detection filter such as a first order derivative filter or a second order derivative filter is applied to a scanned image, so as to derive the patch size, based on the distance between detected edges.

Furthermore, in the above-described embodiment, the explanation was given of the example in which, since the adjustment target device 100 prints the color characteristic chart with a predetermined print setting, in a case where the obtainment of the signal values of the patches is not normally performed in S907, the user is made to perform scanning again. However, there may be such a mode in which the user arbitrarily changes a print setting for printing the color characteristic chart in the adjustment target device 100. In such a case, if the obtainment of the signal values of the patches of the color characteristic chart printed by the adjustment target device 100 is not normally performed, it is also possible to provide a notification for prompting printing of the color characteristic chart again. Moreover, it is also possible that the user is notified of the cause for the failure and the handling method thereof by the same method as that of the above-described embodiment.

Furthermore, although the explanation was given of the example in which the patch size, the number of patches, and the scaling ratio of the patch are all derived and detailed analysis is performed based on these derivation results in the above-described embodiment, the present embodiments are not limited to this example. For example, it is also possible that the user is notified of the cause for an enlargement and a possible handling method thereof, based on the number of patches. Moreover, it is also possible that the user is notified of the cause for a reduction and a possible handling method thereof, based on the patch size.

Furthermore, the above-described embodiments may also be combined in various ways. For example, it is possible that the second embodiment is combined with any of the third to sixth embodiments. Moreover, it is also possible that the fifth embodiment and the sixth embodiment are combined.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2019-187673, filed Oct. 11, 2019, and No. 2020-088133, filed May 20, 2020 which are hereby incorporated by reference wherein in their entirety.

What is claimed is:

1. An image processing apparatus comprising:
a target printer that prints an image on a sheet and is independent from an objective printer;
a scanner that scans a sheet to generate image data, scans a first sheet on which the objective printer has printed a predetermined image including a color chart, and scans a second sheet on which the target printer has printed the predetermined image; and
a controller that performs a color matching process based on first image data which is generated by the scan of the first sheet by the scanner and second image data which is generated by the scan of the second sheet by the scanner, wherein the color matching process comprises a process for matching between a color characteristic of the objective printer and a color characteristic of the target printer,
wherein information used in a color conversion process is generated by performing the color matching process based on the first image data and the second image data.

2. The image processing apparatus according to claim 1,
wherein the scanner includes an auto document feeder (ADF), and
wherein the scanner scans the first sheet and second sheet using the ADF based on a single instruction by a user.

3. The image processing apparatus according to claim 1, wherein the color matching process includes a process of creating a table indicating a signal value of a device independent color space and a signal value of a device dependent color space that depends on the image processing apparatus, the signal value of the device independent color space and the signal value of the device dependent color space corresponding to each other.

4. The image processing apparatus according to claim 1, further comprising:
wherein the controller analyzes the first image data, and
wherein the controller notifies, based on a result of the analyzing, a user of predetermined information.

5. The image processing apparatus according to claim 1, wherein, in a case where a number of patches included in the color chart of the first image data is not equal to or more than a first threshold value, the controller determines that first color chart is enlarged according to a print setting of the objective printer and then printed.

6. A control method of an image processing apparatus that includes a target printer and a scanner and performs a color matching process according to a color reproduction characteristic of an objective printer, the control method comprising:
obtaining first image data by scanning a first color characteristic chart, which is printed by the objective printer, by use of the scanner;
obtaining second image data by scanning a second color characteristic chart, which is printed by the target printer, by use of the scanner; and
performing the color matching process for matching between a color characteristic of the objective printer and a color characteristic of the target printer, based on the first image data and the second image data; and
generating information used in a color conversion process by performing the color matching process based on the first image data and the second image data.

7. A non-transitory computer readable storage medium storing a program which causes a computer to perform a control method of an image processing apparatus that includes a target printer and a scanner and performs a color matching process according to a color reproduction characteristic of an objective device printer, the control method comprising:
obtaining first image data by scanning a first color characteristic chart, which is printed by the objective printer, by use of the scanner;
obtaining second image data by scanning a second color characteristic chart, which is printed by the target printer, by use of the scanner; and
performing the color matching process for matching between a color characteristic of the objective printer and a color characteristic of the target printer, based on the first image data and the second image data; and
generating information used in a color conversion process by performing the color matching process based on the first image data and the second image data.

8. The image processing apparatus according to claim 1, wherein the generated information is a Look-Up Table (LUT).

9. The image processing apparatus according to claim 2, wherein the controller notifies the user of order in which the first sheet and the second sheet are placed.

10. The image processing apparatus according to claim 1,
wherein the generated information is registered in the image processing apparatus,
wherein the controller receives a selection of the generated information by a user from a plurality of pieces of the registered information, and
wherein the selected information is used in the color conversion process.

11. The image processing apparatus according to claim 1, further comprising
a user interface;
wherein the user interface displays, based on an error in the color matching process, information indicating an error.

* * * * *